US011908455B2

(12) United States Patent
Wang et al.

(10) Patent No.: US 11,908,455 B2
(45) Date of Patent: Feb. 20, 2024

(54) SPEECH SEPARATION MODEL TRAINING METHOD AND APPARATUS, STORAGE MEDIUM AND COMPUTER DEVICE

(71) Applicant: Tencent Technology (Shenzhen) Company Limited, Shenzhen (CN)

(72) Inventors: Jun Wang, Shenzhen (CN); Wingyip Lam, Shenzhen (CN); Dan Su, Shenzhen (CN); Dong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 200 days.

(21) Appl. No.: 17/672,565

(22) Filed: Feb. 15, 2022

(65) Prior Publication Data
US 2022/0172708 A1 Jun. 2, 2022

Related U.S. Application Data

(63) Continuation of application No. PCT/CN2020/120815, filed on Oct. 14, 2020.

(30) Foreign Application Priority Data

Jan. 7, 2020 (CN) .......................... 202010013978.7

(51) Int. Cl.
*G10L 15/06* (2013.01)
*G10L 15/05* (2013.01)
*G10L 15/16* (2006.01)

(52) U.S. Cl.
CPC ............ *G10L 15/063* (2013.01); *G10L 15/05* (2013.01); *G10L 15/16* (2013.01)

(58) Field of Classification Search
CPC ....... G10L 15/063; G10L 15/05; G10L 15/16; G10L 21/0308; G10L 21/00; G10L 15/00; Y02T 10/40
See application file for complete search history.

(56) References Cited

U.S. PATENT DOCUMENTS 9,886,954 B1 * 2/2018 Meacham ............. G10L 21/028
10,896,679 B1 * 1/2021 Hu ........................... G06N 3/08
(Continued)

FOREIGN PATENT DOCUMENTS

CN 109036454 A 12/2018
CN 109801644 A 5/2019
(Continued)

OTHER PUBLICATIONS

Tencent Technology, WO, PCT/CN2020/120815, Jan. 20, 2021, 5 pgs.
(Continued)

*Primary Examiner* — Michael Colucci
(74) *Attorney, Agent, or Firm* — Morgan, Lewis & Bockius LLP

(57) ABSTRACT

A speech separation model training method and apparatus, a computer-readable storage medium, and a computer device are provided, the method including: obtaining first audio and second audio, the first audio including target audio and having corresponding labeled audio, and the second audio including noise audio. obtaining an encoding model, an extraction model, and an initial estimation model; performing unsupervised training on the encoding model, the extraction model, and the estimation model according to the second audio, and adjusting model parameters of the extraction model and the estimation model; performing supervised training on the encoding model and the extraction model according to the first audio and the labeled audio corresponding to the first audio, and adjusting a model parameter
(Continued)

of the encoding model; continuously performing the unsupervised training and the supervised training, so that the unsupervised training and the supervised training overlap, and the training is not finished until a training stop condition is met.

20 Claims, 9 Drawing Sheets

(56) References Cited

U.S. PATENT DOCUMENTS

| | | | | |
|---|---|---|---|---|
| 11,798,579 | B2* | 10/2023 | Tanaka | G10L 15/142 |
| 2015/0066486 | A1 | 3/2015 | Kokkinis et al. | |
| 2018/0063163 | A1* | 3/2018 | Pevny | H04L 63/1425 |
| 2018/0366107 | A1* | 12/2018 | Huang | G10L 15/16 |
| 2019/0014137 | A1* | 1/2019 | Du | G06F 16/2372 |
| 2020/0151578 | A1* | 5/2020 | Chen | G06N 20/00 |
| 2020/0175961 | A1* | 6/2020 | Thomson | G10L 15/28 |
| 2020/0334538 | A1* | 10/2020 | Meng | G10L 15/16 |
| 2021/0019357 | A1* | 1/2021 | Bennett | G10L 15/26 |
| 2021/0118432 | A1* | 4/2021 | McCourt | G06N 5/04 |
| 2021/0183392 | A1* | 6/2021 | Lee | G10L 15/26 |
| 2021/0358502 | A1* | 11/2021 | Kim | G10L 15/063 |

FOREIGN PATENT DOCUMENTS

| | | |
|---|---|---|
| CN | 110428842 A | 11/2019 |
| CN | 110473566 A | 11/2019 |
| CN | 110634502 A | 12/2019 |
| CN | 111243620 A | 6/2020 |
| EP | 2028651 A | 2/2009 |

OTHER PUBLICATIONS

Tencent Technology, IPRP, PCT/CN2020/120815, Jul. 12, 2022, 6 pgs.
Extended European Search Report, EP20912595.4, dated Nov. 3, 2022, 5 pgs.
Efthymios Tzinis et al., "Two-Step Sound Source Separation: Training on Learned Latent Targets", Cornell University Library, Oct. 23, 2019, XP081917666, 5 pgs.
Max W. Y. Lam et al., "Mixup-Breakdown: a Consistency Training Method for Improving Generalization of Speech Separation Models", Cornell University Library, Oct. 28, 2019, XP081538346, 6 pgs.
Quan Wang et al., "VoiceFilter: Targeted Voice Separation by Speaker-Conditioned Spectrogram Masking", Cornell University Library, Oct. 11, 2018, XP081020100, 5 pgs.
Tencent Technology, ISR, PCT/CN2020/120815, Jan. 20, 2021, 3 pgs.

* cited by examiner

SPEECH SEPARATION MODEL TRAINING METHOD AND APPARATUS, STORAGE MEDIUM AND COMPUTER DEVICE

CROSS-REFERENCE TO RELATED APPLICATIONS

This application is a continuation application of PCT Patent Application No. PCT/CN2020/120815, entitled "METHOD AND APPARATUS FOR TRAINING SPEECH SEPARATION MODEL, STORAGE MEDIUM, AND COMPUTER DEVICE" filed on Oct. 14, 2020, which claims priority to Chinese Patent Application No. 202010013978.7, filed with the State Intellectual Property Office of the People's Republic of China on Jan. 7, 2020, and entitled "SPEECH SEPARATION MODEL TRAINING METHOD AND APPARATUS, STORAGE MEDIUM AND COMPUTER DEVICE", all of which are incorporated herein by reference in their entirety.

FIELD OF THE TECHNOLOGY

This application relates to the field of computer technologies, and in particular, to a speech separation model training method and apparatus, a storage medium, and a computer device.

BACKGROUND OF THE DISCLOSURE

As an acoustic representation of language, speech is one of the most natural and effective means for humans to exchange information. In a process of voice communication, people may be inevitably interfered by environmental noise or other speakers. These interferences make collected audio not be pure voice of a speaker. Recently, many speech separation models have been trained to separate speech of a target speaker from mixed audio. However, existing speech separation models are usually trained by means of supervised learning. Supervised learning requires manual collecting or labeling high-quality training samples, and this training process is expensive.

SUMMARY

According to embodiments provided in this application, a speech separation model training method and apparatus, a storage medium, and a computer device are provided.

A speech separation model training method is performed by a computer device, the method including:

obtaining first audio and second audio, the first audio including target audio and having corresponding labeled audio, and the second audio including noise audio;

obtaining an encoding model, an extraction model, and an initial estimation model, an output of the encoding model being an input of the extraction model, the output of the encoding model and an output of the extraction model being jointly inputs of the estimation model;

performing unsupervised training on the encoding model, the extraction model, and the estimation model according to the second audio, and adjusting model parameters of the extraction model and the estimation model;

performing supervised training on the encoding model and the extraction model according to the first audio and the labeled audio corresponding to the first audio, and adjusting a model parameter of the encoding model; and continuously performing the unsupervised training and the supervised training in an alternating manner until a training stop condition is met.

A non-transitory computer-readable storage medium storing computer-readable instructions is provided, the computer-readable instructions, when executed by one or more processors of a computer device, causing the computer device to perform the steps of the speech separation model training method.

A computer device, including a memory and a processor, the memory having computer-readable instructions stored thereon, and the computer-readable instructions, when executed by the processor, causing the computer device to perform steps of the foregoing speech separation model training method.

Details of one or more embodiments of this application are provided in the accompany drawings and descriptions below. Other features, objectives, and advantages of this application are illustrated in the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
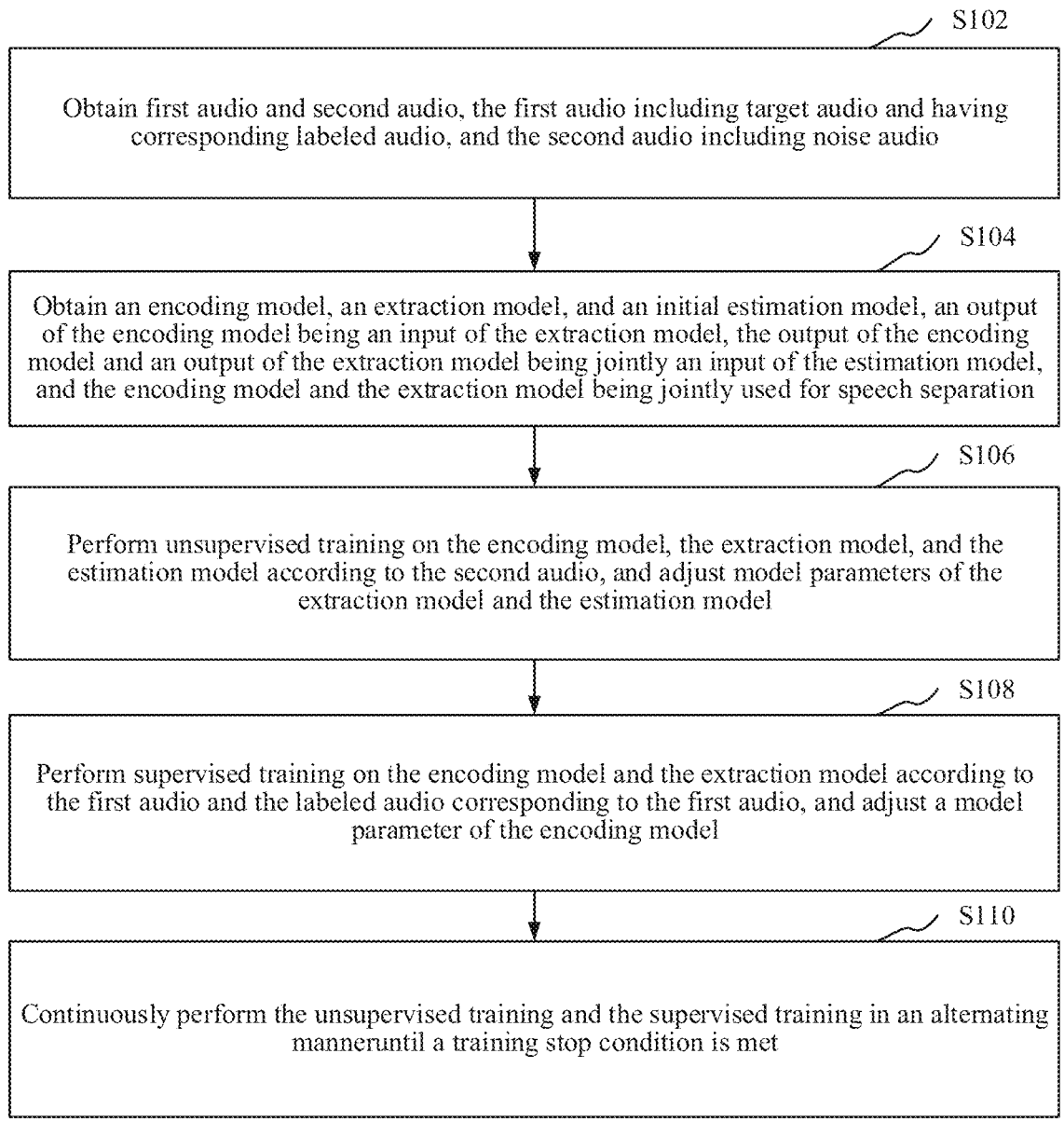
FIG. 1 is a schematic flowchart of a speech separation model training method according to an embodiment.

To make objectives, technical solutions, and advantages of this application clearer and more understandable, this application is further described in detail below with reference to the accompanying drawings and the embodiments. It is to be understood that the specific embodiments described herein are merely used to explain this application but are not intended to limit this application.

Artificial intelligence (AI) is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline, covering a wide range of fields including both hardware-level technologies and software-level technologies. The basic AI technology generally includes a technology such as a sensor, a dedicated AI chip, cloud computing, distributed storage, a big data processing technology, an operation/interaction system, or mechatronics. An AI software technology mainly includes fields such as a CV technology, a speech processing technology, a natural language processing technology, and machine learning/deep learning (DL).

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

Machine learning (ML) is a multi-disciplinary subject involving a plurality of disciplines such as probability theory, statistics, approximation theory, convex analysis, and algorithm complexity theory. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The ML and DL generally include technologies such as an artificial neural network, a belief network, reinforcement learning, transfer learning, inductive learning, and learning from demonstrations.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

The solutions provided in the embodiments of this application involve technologies such as a speech, and machine learning/deep learning of AI, and are specifically described by using the following embodiments.

In the embodiments of this application, an encoding model and an extraction model obtained after unsupervised training and supervised training finish overlapping may be jointly used for speech separation. Speech separation may refer to separating target audio from mixed audio. The mixed audio herein may be speech of a target speaker mixed with noise, or speech of the target speaker mixed with speech of other speakers. The target audio herein may be the speech of the target speaker. In this way, speech separation may refer to separating pure speech of the target speaker from the speech of the target speaker mixed with noise.

As shown in FIG. 1, in an embodiment, a speech separation model training method is provided. In this embodiment, an example of applying the method to a computer device is mainly used for description. The computer device may be a terminal or a server. Referring to FIG. 1, the speech separation model training method specifically includes the following steps:

S102: Obtain first audio and second audio, the first audio including target audio and having corresponding labeled audio, and the second audio including noise audio.

Both the first audio and the second audio are audio used as model training data. The target audio is audio separated from the first audio as a target. The labeled audio is audio used as a model training tag. The labeled audio of the first audio including the target audio is pure target audio. The first audio is mixed audio, and may include noise audio. The noise audio is a concept relative to the target audio, and sound signals other than the target audio are the noise audio. The target audio may be specifically speech of a speaker or melody of a musical instrument. The noise audio may be specifically interference sounds, environmental sounds, or non-target voices or melody.

For example, when a voice collection device collects speech of a target speaker in a far field and there are environmental sounds and speech of other speakers around, collected audio includes the speech of the target speaker, environmental sounds, the speech of other speakers around, and the like. Therefore, the collected audio is used as the first audio, and the target audio included in the first audio is the speech of the target speaker, the noise audio included in the first audio is the environmental sounds, the speech of other speakers around, and the like.

The first audio includes the target audio and the noise audio, and the labeled audio exists correspondingly. In this way, the computer device may perform supervised model training by using the first audio and the corresponding labeled audio.

The second audio may be single audio or mixed audio. When the second audio is the single audio, the second audio is pure noise audio. When the second audio is the pure noise audio, the noise audio is background audio or interference audio. It may be considered that the background audio and the interference audio do not include speech of a speaker. When the second audio is the mixed audio, the second audio includes the target audio and the noise audio.

The second audio includes the noise audio, and the labeled audio does not exist. In this way, the computer device may perform unsupervised model training by using the second audio.

In a specific embodiment, the first audio and the second audio are single-channel audio; the first audio is the mixed audio including the target audio; the labeled audio of the first audio is the pure target audio; and the second audio includes the pure noise audio and the mixed audio including the noise audio.

Specifically, both the first audio and the second audio are audio collected by a single microphone, namely, the single-channel audio. The first audio is the mixed audio, and includes the target audio. The labeled audio of the first audio is the pure target audio. The second audio may be the pure noise audio, and may alternatively be the mixed audio including the noise audio.

For example, the target audio is the speech of the target speaker, the noise audio is environmental sounds of a public place such as a train station or a shopping mall, the first audio is audio of the speech of the target speaker recorded in the far field, and the labeled audio of the first audio may be audio of the speech of the target speaker recorded in the near field. The second audio may be the audio of the speech of the target speaker recorded in the far field, and may alternatively be a recorded background sound when no speaker speaks.

In a specific embodiment, the computer device may mix pure speech of the target speaker with speech of other speakers or environment background sounds, to obtain the first audio. In this way, the pure speech of the target speaker may be used as the labeled audio of the first audio obtained after mixing. The pure speech of the target speaker herein may be recorded in a quiet environment or recorded by a near field microphone.

In a specific embodiment, the computer device may collect the speech of the target speaker by simultaneously using a far field microphone and the near field microphone, audio collected by the far field microphone is used as the first audio, and audio collected by the near field microphone is used as the labeled audio of the first audio. The far field microphone is far away from the target speaker. It may be considered that the far field microphone not only collects the speech of the target speaker, but also collects the environment background sounds and/or the speech of other speakers. That is, what the far field microphone collects is the mixed audio including the speech of the target speaker, which may be used as the first audio. The near field microphone is close to the target speaker, such as at a mouth of the target speaker. It may be considered that what the near field microphone collects is the pure speech of the target speaker, which may be used as the labeled audio of the first audio.

S104: Obtain an encoding model, an extraction model, and an initial estimation model, where an output of the encoding model is an input of the extraction model, the output of the encoding model and an output of the extraction model are jointly inputs of the estimation model, and the encoding model and the extraction model are jointly used for speech separation.

The encoding model is a ML model used for mapping low-dimensional data to high-dimensional data. Herein, a dimension of the low-dimensional data is lower than a dimension of the high-dimensional data. Therefore, they are respectively referred to as the low-dimensional data and the high-dimensional data. The extraction model is a ML model used for constructing an abstract feature according to inputs. The estimation model is a ML model used for estimating mutual information (MI) between two inputs.

Figure 2:
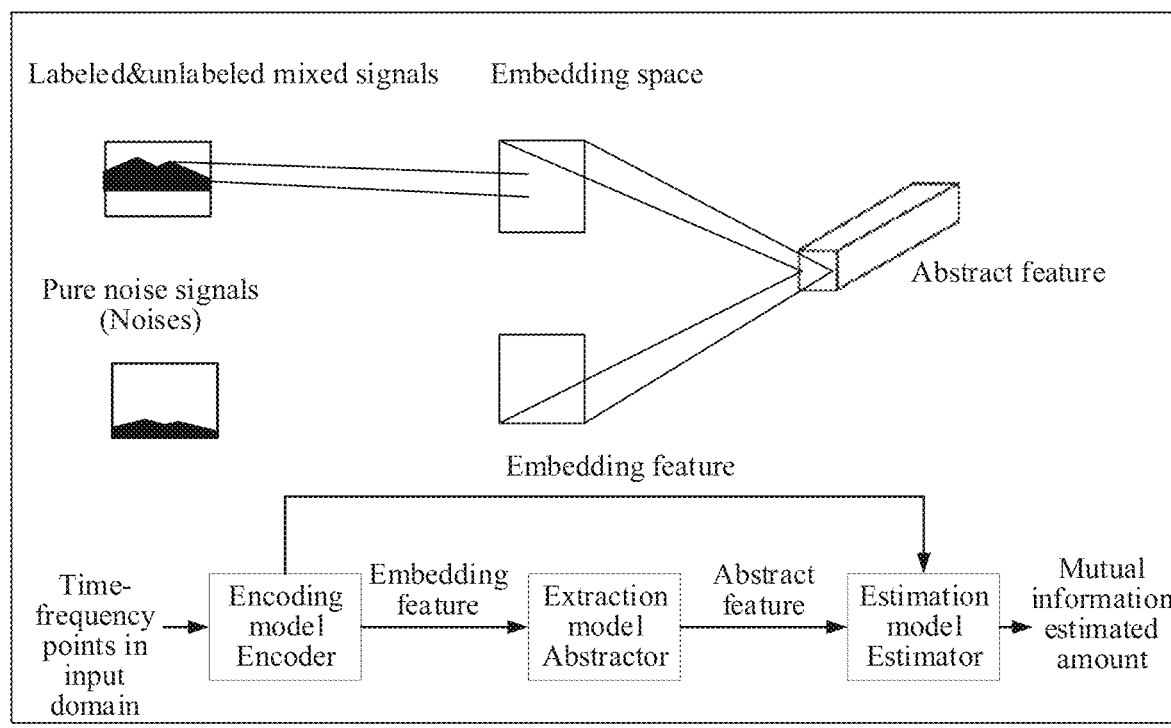
FIG. 2 is a schematic diagram of a model structure of a speech separation model training method according to an embodiment.

For example, referring to FIG. 2, connection relationships among the encoding model, the extraction model, and the initial estimation model may be specifically that: the output of the encoding model is the input of the extraction model; and the output of the encoding model and the output of the extraction model are jointly the input of the estimation model. The input of the encoding model is time-frequency points of labeled and unlabeled mixed signals, and pure noise signals. The encoding model maps time-frequency points of an input domain to an embedding space, to obtain an embedding feature of the embedding space; and the extraction model extracts an abstract feature of the speech of the target speaker from the embedding feature. An output of the estimation model is an estimation amount of MI.

The encoding model and the extraction model are jointly used for speech separation. That is, the encoding model and the extraction model are jointly used for separating the target audio from the mixed audio. The encoding model and the extraction model are components of a speech separation model, and the speech separation model includes the encoding model and the extraction model.

In most industrial applications that actually use speech enhancement and separation, labeled audio can only cover a small part of application scenarios, and a large amount of data is unlabeled. In addition to a problem of obtaining efficiency of training data, only relying on labeled data for supervised learning also has problems in robustness and generalization. For example, a speech feature learned in a disturbing speech environment by performing only supervised learning is often not applicable to another background noise environment. In this way, in the embodiments of this application, the computer device may use a large amount of unlabeled audio and the estimation model, and use robustness and generalization of a representation capability of unsupervised learning, to optimize a discrimination capability of supervised learning; and use the discrimination capability of supervised learning, to optimize the representation capability of unsupervised learning. The discrimination capability learned from supervised training is to discriminate the target audio from the mixed audio.

The computer device may obtain the initial encoding model, the extraction model, and the estimation model, and perform subsequent training on these models, so that the encoding model and the extraction model obtained through training may be jointly used for speech separation.

In an embodiment, the computer device may pre-train the encoding model and the extraction model by using the labeled audio in a supervised manner. For the specific pre-training process, refer to the description in the subsequent embodiments. In this way, the computer device may obtain the encoding model, the extraction model, and the initial estimation model obtained after pre-training; and perform subsequent training on these models, so that precision of these models is relatively high.

In a specific embodiment, the encoding model and the extraction model may specifically use a bidirectional long short-term memory network (BiLSTM) structure, a long short-term memory network (LSTM) structure, a convolutional neural network (CNN) structure, or a model combined with another network structure. For example, the other network structure may be a time delay network structure or a gated CNN structure. A model type and a topology structure are not limited in this application, and various other effective new model structures may be used for replacement. The estimation model may calculate an inner product between two inputs by using a feature matrix.

S106: Perform unsupervised training on the encoding model, the extraction model, and the estimation model according to the second audio, and adjust model parameters of the extraction model and the estimation model.

The unsupervised training may also be referred to as unsupervised learning, and is a manner that a ML model learns based on unlabeled sample data.

In an embodiment, the performing unsupervised training on the encoding model, the extraction model, and the estimation model according to the second audio, and adjusting model parameters of the extraction model and the estimation model includes: encoding an audio feature of the second audio through the encoding model, to obtain an embedding feature of the second audio; extracting the embedding feature of the second audio through the extraction model, to obtain an abstract feature of the target audio included in the second audio; processing the embedding feature of the second audio and the abstract feature of the target audio included in the second audio through the estimation model, to obtain an MI estimation feature between the second audio and the abstract feature of the target audio included in the second audio; constructing an unsupervised training loss function according to the MI estimation feature; and fixing the model parameter of the encoding model, and adjusting the model parameters of the extraction model and the estimation model according to a direction of minimizing the unsupervised training loss function.

The audio feature is data obtained by processing physical information of audio. For example, the physical information may be spectrum information. The audio feature may be specifically a time-frequency feature, a Gammatone power spectrum feature, a spectrum amplitude feature, a Mel frequency cepstrum coefficient (MFCC) feature, or the like, where Gammatone is a filtered feature of simulating a human cochlea.

In an embodiment, the computer device may perform short-time Fourier transform (STFT) on the second audio, to obtain time-frequency points of the second audio; and obtain a time-frequency feature formed by the time-frequency points as the audio feature of the second audio.

Specifically, the computer device may perform the STFT on the second audio, to obtain a short-time Fourier spectrum $\chi \subseteq R^{TF}$ of the second audio, where T represents a quantity of frames of a time dimension, F represents a quantity of frequency bands of a frequency dimension, and R represents a real number.

In this embodiment of this application, the short-time Fourier spectrum of the second audio is used as input data (training samples) of the encoding model. In this way, a group of unlabeled training samples obtained from a group of unlabeled second audio may be represented as: $\{X^{(1)}, X^{(2)}, \ldots, X^{(L)} \in \chi\}$. Then, each training sample may be a group of time-frequency points $\{x=X_{t,f}\}_{t=1,\ldots,T; f=1,\ldots,F}$ of an input space. $X_{t,f}$ may represent time-frequency points of a $f^{th}$ frequency band in a $t^{th}$ frame. A time-frequency feature formed by these time-frequency points may be specifically a real number matrix with a dimension of T×F.

For mixed audio which mixes the target audio and the noise audio, it may be considered that a time-frequency point X of the mixed audio is formed by mixing a time-frequency point x of the target audio with a time-frequency point e of the noise audio, for example, X=x+e.

In addition, a group of unsupervised training samples obtained from the pure noise audio may be represented as: $\{X^{(L+1)}, X^{(L+2)}, \ldots, X^{(L+U)} \in \chi\}$.

In a specific embodiment, a sampling rate of audio is 16 kHz, namely, 16k sampling points per second. The STFT uses an STFT window length of 25 ms, window shift of 10 ms, and 257 frequency bands. That is, when framing is performed on the audio, the window length is 25 ms, and the window shift is 10 ms, so as to obtain a quantity of frames T, and F=257.

In an embodiment, the computer device may map a low-dimensional audio feature to a high-dimensional embedding space through the encoding model, to obtain an embedding feature.

Specifically, the computer device may input a time-frequency point matrix (the time-frequency feature) of the second audio obtained by performing the STFT on the second audio into the encoding model. The encoding model performs a non-linear operation on the input, and embeds the inputs into a D-dimensional embedding space, to obtain the embedding feature of the second audio in the embedding space.

For example, still referring to FIG. 2, the encoding model is: $E_\theta: \chi \rightarrow v \subseteq R^{TF \times D}$, where $\theta$ is the model parameter of the encoding model, D is a dimension of the embedding space, $E_\theta$ represents an operation process of mapping an input domain $\chi$ to a high-dimensional embedding space v. An embedding feature obtained by mapping a time-frequency feature formed by a group of time-frequency points in the input space is a real number matrix with a dimension of T×F×D.

An input domain $\chi \subseteq R^{TF}$ represents a short-time Fourier spectrum of the audio, T represents a quantity of frames of a time dimension, and F represents a quantity of frequency bands of a frequency dimension. The input of the encoding model is a group of time-frequency points (T×F) belonging to the input domain, this group of time-frequency points may be divided into T groups according to frames, with time-frequency points (1×F) per group, namely, time-frequency points of each frame of the audio. Then, an embedding feature v of an output domain may alternatively be an embedding feature $v_T$ corresponding to each frame of the audio, namely, each frame of the second audio respectively corresponds to an embedding feature.

In a specific embodiment, the encoding model may alternatively be a four-layer BiLSTM structure, and there are 600 nodes in each hidden layer. The BiLSTM structure is subsequently connected to a fully connected layer, and maps a 600-dimensional hidden vector to a high-dimensional embedding space with 257*40 dimensions, where 257 is the quantity of STFT frequency bands, namely, T; and 40 is the dimension of the embedding space, namely, D.

In an embodiment, the extracting the embedding feature of the second audio through the extraction model, to obtain an abstract feature of the target audio included in the second audio includes: processing the embedding feature of the second audio through a first hidden layer of the extraction model, to obtain a prediction probability that the time-frequency points of the second audio are time-frequency points of the target audio; and chronologically operating embedding features of the time-frequency points and prediction probabilities of the time-frequency points through a second hidden layer of the extraction model, to construct a global abstract feature of the target audio included in the second audio.

The hidden layer is a term in a network model, and is an intermediate layer relative to an input layer and an output layer. The hidden layer includes model parameters obtained by training network models. The hidden layer of the extraction model herein is an intermediate layer relative to an input layer of the extraction model and an output layer of the extraction model. All intermediate layers between the input layer and the output layer of the extraction model may be collectively referred to as hidden layers, or the intermediate layers may be divided into a plurality of hidden layers, for example, the first hidden layer or the second hidden layer. The hidden layers of the extraction model may include a plurality of network structures. Each network structure may include one or more network layers. The hidden layers of the extraction model may be understood and described as "black boxes" herein.

Specifically, the processing on the embedding feature of the second audio is performed through the first hidden layer of the extraction model, so that the prediction probability that the time-frequency points of the second audio are predicted to belong to the time-frequency points of the target audio may be obtained. The embedding features of the time-frequency points and the prediction probabilities of the time-frequency points are chronologically operated through the second hidden layer of the extraction model, so that the global abstract feature of the target audio included in the second audio may be obtained.

For example, still referring to FIG. 2, the extraction model is $A_\varphi: \upsilon \to P \subseteq R^{TF}$, $\upsilon \times P \to C \subseteq R^D$, where $\varphi$ is the model parameter of the extraction model. $A_\varphi$ represents that the embedding feature $\upsilon$ is converted into a probability matrix P, and an operation process of an abstract feature c is obtained according to operation on the embedding feature $\upsilon$ and the probability matrix p. p is a real number matrix with a dimension of T×F. c is a real number vector with a dimension of D×1 or 1×D.

The input of the encoding model is the group of time-frequency points (T×F) belonging to the input domain, and p is a real number matrix with a dimension of T×F In this way, p may be a probability matrix formed by prediction probabilities respectively corresponding to T×F time-frequency points. The prediction probabilities represent probabilities that the time-frequency points are predicted to be the time-frequency points of the target audio.

In a specific embodiment, the extraction model may calculate the global abstract feature by using the following formula:

$$c = \frac{\sum_{k,f} \upsilon e\, p}{\sum_{k,f} p} \quad (1)$$

Where, $c \in C$ is the global abstract feature of the target audio included in the second audio, $\upsilon \in v$ is the embedding feature, $p \in P$ is the prediction probability, t represents a frame index, f represents a frequency band index, and e represents an element point product.

In an embodiment, the extraction model may multiply formula (1) by a binary threshold matrix, to reduce an influence of low-energy noise, as shown below:

$$c = \frac{\sum_{k,f} \upsilon e\, pe\, w}{\sum_{k,f} pe\, w} \quad (2)$$

Where, $w \in R^{TF}$ represents the below binary threshold matrix:

$$w_{t,f} = \begin{cases} 0, & \text{if } X_{t,f} < \max(X)/100 \\ 1, & \text{otherwise} \end{cases} \quad (3)$$

For brief representation, embedding-dimensional index subscripts of c and $\upsilon$ are omitted in the formula provided in this embodiment of this application.

Figure 3:
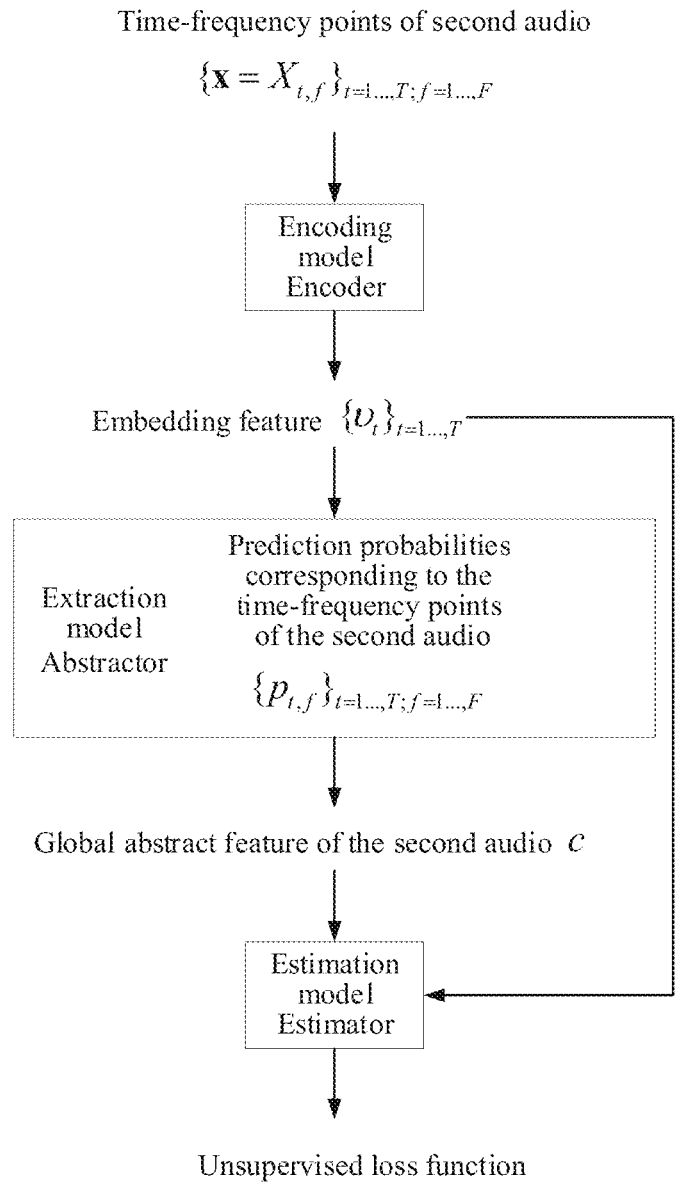
FIG. 3 is a schematic flowchart of unsupervised training according to an embodiment.

For example, as shown in FIG. 3, in an unsupervised training stage, time-frequency points $\{x=X_{t,f}\}_{t=1,\ldots,T; f=1,\ldots,F}$ of the second audio are inputted into the encoding model, and embedding features $\{\upsilon_t\}_{t=1,\ldots,T}$ corresponding to frames of the second audio are outputted; and $\{\upsilon_t\}_{t=1,\ldots,T}$ is inputted into the extraction model to obtain an intermediate result, namely, prediction probabilities $\{p_{t,f}\}_{t=1,\ldots,T; f=1,\ldots,F}$ corresponding to the time-frequency points of the second audio, and a global abstract feature c of the second audio is outputted. $\{\upsilon_t\}_{t=1,\ldots,T}$ and c are jointly inputted into the estimation model, and an unsupervised loss function may be constructed based on an output of the estimation model.

In a specific embodiment, the extraction model specifically may use an autoregression model, to chronologically construct the global abstract feature (which may be long-time, namely, a relatively low time-domain resolution) based on a local embedding feature (an embedding feature of a current frame of the second audio). Alternatively, the extraction model may alternatively use a recurrent model or an abstract function, and construct the global abstract feature based on the local embedding feature.

In a specific embodiment, the extraction model includes a fully connected layer, maps a 257*40-dimensional hidden vector to 600 dimensions, and inputs the hidden vector into a two-layer BiLSTM structure, and there are 600 nodes in each hidden layer.

In this embodiment, the extraction model extracts a global, long-term stable, and "slow" (a low time-domain resolution) abstract feature from the embedding feature through unsupervised learning, which can more accurately describe the feature of the target audio hidden in the second audio, so that the extraction model is more accurately used for speech separation subsequently.

The encoding model encodes all input information in the embedding feature, while the extraction model only extracts an abstract feature from target information hidden in the input data, namely, extracts the abstract feature of the target audio included in the second audio.

In an embodiment, the computer device may estimate, through the estimation model, an MI estimation feature between the second audio and the abstract feature of the target audio included in the second audio according to the embedding feature of the second audio and the abstract feature of the target audio included in the second audio.

The MI estimation feature refers to a feature related to MI. The MI is a measure of information, which can be seen as an amount of information related to another variable contained in one variable. The MI cannot usually be accurately estimated. In this embodiment, the MI estimation feature may be represented as an estimation on MI between the second audio and the abstract feature of the target audio included in the second audio.

Specifically, the estimation model may combine the embedding feature of the second audio with the abstract feature of the target audio included in the second audio to perform operation, to obtain the MI estimation feature between the second audio and the abstract feature of the target audio included in the second audio. The combination herein may be specifically splicing, that is, the embedding feature of the second audio and the abstract feature of the target audio included in the second audio are spliced together.

For example, still referring to FIG. 2, the estimation model is $T_\omega: v \times c \to MI \subseteq R$, where, $\omega$ is the model parameter of the estimation model, $T_\omega$ represents an operation process of estimating the MI estimation feature between the second audio and the abstract feature c of the target audio included in the second audio. Specifically, $T_\omega = D_\omega \circ g \circ (v,c)$, where, g represents a function that the embedding feature v and the abstract feature c are combined together, and MI is a real number.

In a specific embodiment, the estimation model specifically uses a weighted matrix $\omega \in R^{40 \times 40}$ used for calculating an inner product: $T_\omega(v,c) = c^T \omega c$.

In this embodiment, the estimation model is used for estimating MI between the mixed audio and an abstract feature of the target audio included in the mixed audio, and may construct, based on a physical meaning of the MI, an unsupervised learning loss function according to the MI, so that the constructed loss function may be used for model training.

In an embodiment, the constructing an unsupervised training loss function according to the MI estimation feature includes: dividing first time-frequency points predicted to be positive samples according to the prediction probabilities of the time-frequency points; obtaining second time-frequency points used as negative samples, the second time-frequency points being taken from a noise proposal distribution obeyed by time-frequency points of the pure noise audio; constructing the unsupervised training loss function according to an MI estimation feature corresponding to the first time-frequency points and an MI estimation feature corresponding to the second time-frequency points.

Usually, a speech separation task may be regarded as a binary classification task. That is, time-frequency points of to-be-separated audio are classified into positive samples, namely, the time-frequency points of the target audio; or are classified into negative samples, namely, time-frequency points of non-target audio. In this embodiment of this application, a probability threshold may be preset. When a prediction probability of a time-frequency point reaches or exceeds the probability threshold, the time-frequency point is divided into a positive sample.

In addition, the time-frequency points of the pure noise audio obey the noise proposal distribution. For a probability distribution p(x) that cannot be directly sampled, a commonly used probability distribution q(x) may be constructed, so that all x meet k*q(x)>p(x); and a rejection sampling method is used for sampling p(x), and the q(x) is referred to as a proposal distribution. In this way, the noise proposal distribution may be regarded as a proposal distribution of the probability distribution obeyed by the noise audio. The computer device may obtain the second time-frequency points used as the negative samples from the noise proposal distribution; and construct the unsupervised training loss function according to the MI estimation feature corresponding to the first time-frequency points and the MI estimation feature corresponding to the second time-frequency points.

In a specific embodiment, a formula for the unsupervised training loss function is as follows:

$$L_\Theta^{(ImNICE)} = -E_p\left[\log\frac{f_\Theta(x, c)}{f_\Theta(x, c) + E_{\tilde{p}}\left[\sum_{x'} f_\Theta(x', c)\right]}\right] \quad (4)$$

Where, $f_\Theta(x,c)=\exp(T_\omega(E_\theta(x),c))$; c: $A_\varphi(E_\theta(x))\in C$ represents the abstract feature of the target audio included in the second audio; and x represents time-frequency points predicted to be the positive samples, and a distribution p; p(x,c) of these time-frequency points represents a combined distribution of x and c. The computer device may output an intermediate layer of the extraction model, that is, prediction probabilities p of time-frequency points are used as estimation values of p(x,c). x' represents time-frequency points used as the negative sample that are extracted from the proposal distribution $\tilde{p}$ of the pure noise audio. $E_p(z)$ represents that the calculation obeys an expectation of a variable z of a distribution p.

In other embodiments, x' may alternatively be a set of time-frequency points predicted to be the non-target audio and time-frequency points extracted from the pure noise audio.

In this embodiment of this application, the unsupervised training loss function may be named as InfoMax noise-interference contractive estimation (ImNICE).

In this embodiment, the estimation model is used for estimating MI between two data, and may also be referred to as an MI model.

A combined probability distribution p(x,c) required in the unsupervised training loss function may be outputted by the intermediate layer of the extraction model as the estimation values of p(x,c) and the extraction model is trained in a pre-training stage and a subsequent supervised training stage. In this way, it may be regarded that a reliable combined probability distribution p(x,c) used for unsupervised learning is effectively estimated through supervised training. A probability distribution obeyed by prediction probabilities corresponding to time-frequency points outputted from the intermediate layer of the extraction model may be used as the estimation values of p(x,c).

In an embodiment, the computer device may input the time-frequency points of the second audio into the encoding model and the extraction model after the encoding model and the extraction model are pre-trained, to obtain the prediction probabilities respectively corresponding to the time-frequency points of the second audio, and divide the time-frequency points of the second audio into the time-frequency points predicted to be the target audio and the time-frequency points predicted to be the non-target audio according to the prediction probabilities of the time-frequency points. The time-frequency points predicted to be the target audio are regarded as the positive samples, and the negative samples are selected from the time-frequency points predicted to be the non-target audio and the time-frequency points of the pure noise audio. The probability distribution obeyed by the prediction probabilities corresponding to the time-frequency points outputted from the intermediate layer of the extraction model may be used as the estimation values of p(x,c) in subsequent unsupervised learning. In this way, sample division and determination of the combined probability distribution are performed outside an unsupervised training iteration process, which may reduce a calculation amount in each iteration, but may have a relatively slow convergence speed.

In an embodiment, the computer device may input the time-frequency points of the second audio into the encoding model and the extraction model in the unsupervised training, to obtain the prediction probabilities respectively corresponding to the time-frequency points of the second audio, and divide the time-frequency points of the second audio into the time-frequency points predicted to be the target audio and the time-frequency points predicted to be the non-target audio according to the prediction probabilities of the time-frequency points. The time-frequency points predicted to be the target audio are regarded as the positive samples, and the negative samples are selected from the time-frequency points predicted to be the non-target audio and the time-frequency points of the pure noise audio. The probability distribution obeyed by the prediction probabilities corresponding to the time-frequency points outputted from the intermediate layer of the extraction model may be used as the estimation values of p (x,c) in this iteration. In this way, the sample division and the determination of the combined probability distribution are performed inside the unsupervised training iteration process, which can improve a convergence speed, but may bring more calculation amounts for each iteration.

In this embodiment, the unsupervised training function is constructed with the help of the physical meaning of MI, and the discrimination capability learned in supervised learning is used for unsupervised learning, which effectively combines the unsupervised learning and the supervised learning, promotes mutual optimization, and improves model training efficiency and effectiveness.

Further, the computer device may fix the model parameter of the encoding model, and adjust the model parameters of the extraction model and the estimation model according to the direction of minimizing the unsupervised training loss function.

In the above embodiments, a large amount of unlabeled second audio is used for unsupervised training. In an unsupervised learning stage, the model parameter of the encoding model is fixed and not updated, and only the model parameters of the extraction model and the estimation model are updated. In this way, the abstract feature may be calculated based on a stable discriminative embedding feature space constructed in a previous stage of pre-training, and an extraction capability in the unsupervised process may be optimized by using the capability learned in the supervised learning, so that an abstract feature with robustness and generalization is extracted from hidden information from disturbed mixed signals.

In a specific embodiment, the computer device may set a size of batch processing data to 32, an initial learning rate to 0.0001, a weight reduction coefficient of the learning rate to 0.8, a quantity of output layer nodes of the encoding model to 40, a quantity of random down-sampling frames for each segment of audio to 32, a quantity of negative samples corresponding to each positive sample in formula (1) to 63, and a probability threshold of a positive sample prediction probability to 0.5.

S108: Perform supervised training on the encoding model and the extraction model according to the first audio and the labeled audio corresponding to the first audio, and adjust the model parameter of the encoding model.

The supervised training may also be referred to as supervised learning, and is a manner that a ML model learns based on labeled sample data. In this embodiment of this application, the supervised learning and the unsupervised learning share the same encoding model and extraction model.

In an embodiment, the performing supervised training on the encoding model and the extraction model according to the first audio and the labeled audio corresponding to the first audio, and adjusting the model parameter of the encoding model includes: encoding an audio feature of the first audio through the encoding model, to obtain an embedding feature of the first audio; extracting the embedding feature of the first audio through the extraction model, to obtain an abstract feature of the target audio included in the first audio; constructing a supervised training loss function according to the labeled audio of the first audio, the embedding feature of the first audio, and the abstract feature of the target audio included in the first audio; and fixing the model parameter of the extraction model, and adjusting the model parameter of the encoding model and the estimation model according to a direction of minimizing the supervised training loss function.

In an embodiment, the computer device may perform FT on the first audio, to obtain the audio feature of the first audio. For example, the computer device performs the STFT on the first audio, to obtain time-frequency points of the first audio; and obtains a time-frequency feature formed by the time-frequency points as the audio feature of the first audio.

Specifically, the computer device may perform the STFT on the first audio, to obtain a short-time Fourier spectrum $\chi \subseteq R^{TF}$ of the first audio, where T represents a quantity of frames of a time dimension, F represents a quantity of frequency bands of a frequency dimension, and R represents a real number.

In this embodiment of this application, the short-time Fourier spectrum of the first audio is used as input data (training samples) of the encoding model. In this way, a group of labeled training samples obtained from a group of labeled first audio may be represented to: $\{X^{(L+U+1)}, X^{(L+U+2)}, \ldots, X^{(L+U+N)} \in \chi\}$. Then, each training sample may be a group of time-frequency points $\{x=X_{t,f}\}_{t=1,\ldots,T;f=1,\ldots,F}$ of an input space. $X_{t,f}$ may represent time-frequency points of a $f^{th}$ frequency band in a $t^{th}$ frame. A time-frequency feature formed by these time-frequency points may be specifically a real number matrix with a dimension of T×F.

In other embodiments, the computer device may alternatively calculate a Gammatone power spectrum feature, a spectrum amplitude feature, an MFCC feature, or the like of the first audio as the audio feature of the first audio.

In an embodiment, the computer device may map a low-dimensional audio feature to a high-dimensional embedding space through the encoding model, to obtain an embedding feature.

Specifically, the computer device may input a time-frequency point matrix (the time-frequency feature) of the first audio obtained by performing the STFT on the first audio into the encoding model. The encoding model performs non-linear operation on the input, and embeds the input into a D-dimensional embedding space, to obtain the embedding feature of the first audio in the embedding space.

For example, the encoding model is: $E_\theta:\chi \to \upsilon \subseteq R^{TF \times D}$, where $\theta$ is the model parameter of the encoding model, D is a dimension of the embedding space, $E_\theta$ represents an operation process of mapping an input domain $\lambda$ to a high-dimensional embedding space $\upsilon$. An embedding feature obtained by mapping a time-frequency feature formed by a group of time-frequency points in the input space is a real number matrix with a dimension of T×F×D. An input domain $\chi \subseteq R^{TF}$ represents a short-time Fourier spectrum of the audio, T represents a quantity of frames of a time dimension, and F represents a quantity of frequency bands of a frequency dimension. The input of the encoding model is a group of time-frequency points (T×F) belonging to the input domain, this group of time-frequency points may be divided into T groups according to frames, with time-frequency points (1×F) per group, namely, time-frequency points of each frame of the audio. Then, an embedding feature $\upsilon$ of an output domain may alternatively be an embedding feature $\upsilon_t$ corresponding to each frame of the audio, namely, each frame of the second audio respectively corresponds to an embedding feature, and may alternatively be referred to as a time-varying embedding feature.

In an embodiment, the computer device may perform a processing on the embedding feature through the first hidden layer of the extraction model, to obtain a prediction probability that the time-frequency points of the first audio are the time-frequency points of the target audio; and operate embedding features of the time-frequency points and prediction probabilities of the time-frequency points through the second hidden layer of the extraction model, to construct a time-varying abstract feature of the target audio included in the first audio.

Specifically, the processing on the embedding feature of the first audio is performed through the first hidden layer of the extraction model, so that the prediction probability that the time-frequency points of the first audio are predicted to be the time-frequency points of the target audio may be obtained. The embedding features of the time-frequency points and the prediction probabilities of the time-frequency points are operated through the second hidden layer of the extraction model, so that the time-varying abstract feature of the target audio included in the first audio may be constructed.

For example, the extraction model is $A_\psi : \upsilon \to P \subseteq R^{TF}$, $\upsilon \times P \to C \subseteq R^D$, where $\varphi$ is the model parameter of the extraction model. $A_\varphi$ represents that the embedding feature $\upsilon$ is converted into a probability matrix p, and an operation process of an abstract feature c is obtained according to operation on the embedding feature $\upsilon$ and the probability matrix p. p is a real number matrix with a dimension of T×F. c is a real number vector with a dimension of D×1 or 1×D. The input of the encoding model is the group of time-frequency points (T×F) belonging to the input domain, and p is a real number matrix with a dimension of T×F. In this way, p may be a probability matrix formed by prediction probabilities respectively corresponding to T×F time-frequency points. The prediction probabilities represent probabilities that the time-frequency points are predicted to be the time-frequency points of the target audio.

In a specific embodiment, the extraction model may calculate the time-varying abstract feature by using the following formula:

$$c_t = \frac{\sum_f \upsilon_t \, e \, p_t}{\sum_f p_t} \quad (5)$$

Where, $c_t \in C$ is an abstract feature of a $t^{th}$ frame of the target audio included in the first audio, namely, the time-varying abstract feature of the target audio included in the first audio, $\upsilon_t \in \upsilon$ is the embedding feature, $p_t \in P$ is the prediction probability, t represents a frame index, f represents a frequency band index, and e represents an element point product.

In an embodiment, the extraction model may multiply formula (5) by a binary threshold matrix, to reduce an influence of low-energy noise, as shown below:

$$c_t = \frac{\sum_f \upsilon_t \, e \, p_t \, e \, w_t}{\sum_f p_t \, e \, w_t} \quad (6)$$

Where, the binary threshold matrix represented by $w \in R^{TF}$ is the same as the formula (3) in the above embodiment.

For brief representation, embedding-dimensional index subscripts of c and $\upsilon$ are omitted in the formula provided in this embodiment of this application.

Figure 4:
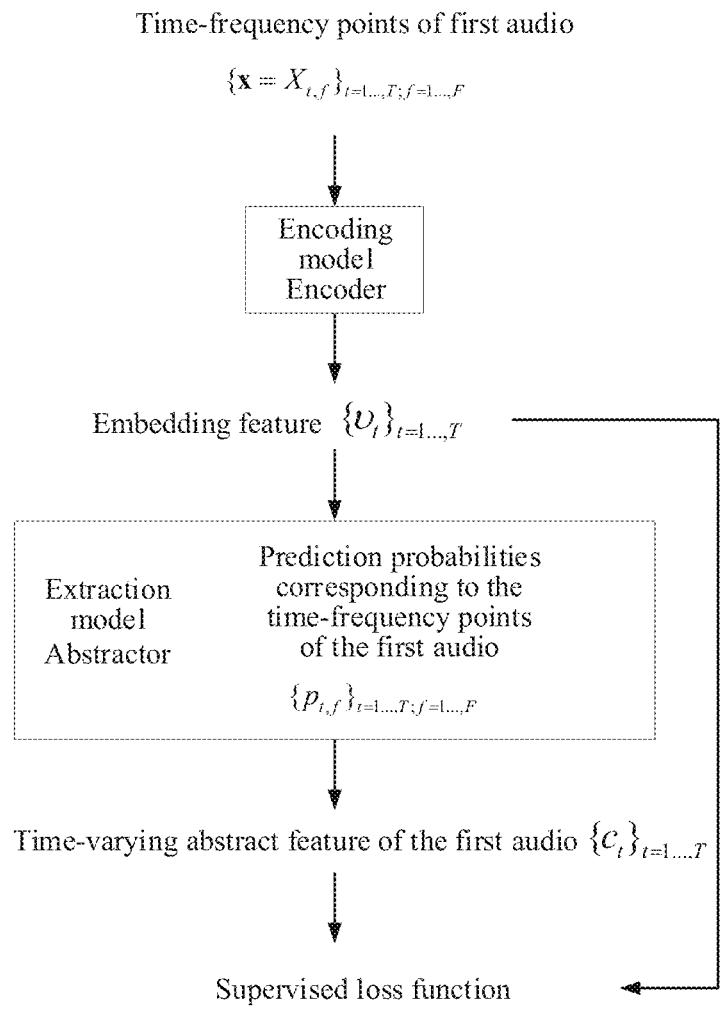
FIG. 4 is a schematic flowchart of supervised training according to an embodiment.

For example, as shown in FIG. 4, at a supervised training stage, time-frequency points $\{x=X_{t,f}\}_{t=1 \ldots, T; f=1 \ldots, F}$ of the first audio are inputted into the encoding model, and embedding features $\{\upsilon_t\}_{t=1 \ldots, T}$ corresponding to frames of the first audio are outputted; and $\{\upsilon_t\}_{t=1 \ldots, T}$ is inputted into the extraction model to obtain an intermediate result, namely, prediction probabilities $\{p_{t,f}\}_{t=1 \ldots, T; f=1 \ldots, F}$ corresponding to the time-frequency points of the first audio, and a time-varying abstract feature $\{c_t\}_{t=1 \ldots, T}$ of the first audio is outputted. The supervised loss function may be constructed based on $\{x=X_{t,f}\}_{t=1 \ldots, T; f=1 \ldots, F}$, $\{\upsilon_t\}_{t=1 \ldots, T}$, and $\{c_t\}_{t=1 \ldots, T}$.

In a specific embodiment, the extraction model may specifically use an autoregression model, and construct the time-varying abstract feature based on local embedding features (embedding features of frames of the second audio). Alternatively, the extraction model may alternatively use a recurrent model or an abstract function, and construct the time-varying abstract feature based on the local embedding features (the embedding features of the frames of the second audio).

In this embodiment, the extraction model extracts, through supervised learning, a time-domain and high-time-domain-resolution abstract feature from the embedding features, which can more accurately reconstruct a spectrum of the target audio in a mixed audio, thereby performing supervised learning.

In an embodiment, the computer device may determine a spectrum mask of the target audio included in the first audio according to the embedding feature of the first audio and the abstract feature of the target audio included in the first audio; reconstruct the target audio based on the spectrum mask; and construct the supervised training loss function to pre-train the encoding model and the extraction model according to a difference between the reconstructed target audio and the labeled audio of the first audio.

The spectrum mask is used for separating a spectrum of audio from the mixed audio. For example, assuming that mixed audio includes a target object, namely, a target speaker, corresponding to speech 1 and the speech 1 corresponds to the spectrum mask 1 (which is shortened to M1), a speech spectrum corresponding to the separated speech 1 may be obtained by multiplying the M1 by a spectrum of the mixed audio.

Specifically, in the supervised training, the computer device may reconstruct a type of target function as the supervised training loss function. Through this type of target function, the supervised training model may ensure, to some extent, that features learned from the intermediate layer are encoding for the target audio. This also shows a reason for effectively estimating the reliable combined probability distribution used for unsupervised training by combining the discriminative learning capability of supervised training.

In a specific embodiment, the supervised training loss function may specifically estimate a mean square error (MSE) between the spectrum of the target audio and the spectrum of the labeled audio:

$$L_{\theta,\psi}^{(MSE)} = \sum_{t,f} \| x - \chi g Sigmoid(c_t^T \upsilon_t, f) \|_2^2 \quad (7)$$

Where, $\theta$ and $\psi$ are the model parameters, $c_t$ is the time-varying abstract feature calculated by the formula (6), and $\upsilon_t$ is a time-varying embedding feature. xgSigmoid $(c_t^T \upsilon_t, f)$ is the spectrum of the reconstructed target audio, and $\chi$ is the spectrum of the labeled audio. The supervised learning based on an MSE loss function may effectively use labeled training data to regularize the discriminative embedding feature space.

In other embodiments, the supervised training function may alternatively use another reconstruction type of target function, for example, a scale-invariant signal-to-noise ratio (SI-SNR) target function, or the like.

Further, the computer device may fix the model parameters of the extraction model and the estimation model, and adjust the model parameter of the encoding model according to the direction of minimizing the supervised training loss function.

In the above embodiments, the labeled first audio is used for supervised training. At a supervised learning stage, the model parameters of the extraction model and the estimation model are fixed and not updated, and only the model parameter of the encoding model is updated. In this way, a discriminative embedding feature of an embedding space may further be fine-tuned based on a more robust and general abstract feature obtained at the previous stage of unsupervised training.

S110: Continuously perform the unsupervised training and the supervised training in an alternating manner until a training stop condition is met.

On the one hand, the supervised learning may effectively use labeled data to regularize the discriminative embedding feature space, but is limited by problems such as data efficiency, robustness, and generalization. On the other hand, the unsupervised learning is a powerful learning method that improves robustness and generalization through unlabeled data. In this embodiment of this application, an overlapping supervision-unsupervised learning (ASU) model training manner is provided, so that a shared network model in the same architecture is updated by the supervised learning and the unsupervised learning in an alternately alternating manner.

Specifically, the encoding model and extraction model are obtained in the pre-training stage, and a relatively stable discriminative embedding feature space is constructed through the encoding model; and the subsequent supervised learning process and the unsupervised learning process are performed in the alternating manner until the model converges.

At the unsupervised learning stage, the model parameter of the encoding model is fixed and not updated, and only the model parameters of the extraction model and the estimation model are updated, so that the abstract feature is calculated based on the stable discriminative embedding feature space constructed in the previous stage. At the supervised learning stage, the model parameters of the extraction model and the estimation model are fixed and not updated, and only the model parameter of the encoding model is updated, so that the discriminative embedding feature space is further fine-tuned based on the more robust and general abstract feature obtained in the previous stage.

In an embodiment, the computer device may divide a part of the first audio as test data, and when MSE loss on the test data is not improved for a preset number of consecutive iterations, it may be considered that the model has reached convergence and the training may be stopped. Moreover, according to actual training and tests, it is found that time required by overlapping training of the unsupervised learning stage and the supervised learning stage in the process of ASU is much smaller than a pre-training time. This is because, at the overlapping stage, fine-tuning is mainly performed based on the models obtained from pre-training, so the convergence may be achieved quickly.

In an embodiment, an intuitive highlight-oriented selection mechanism may be used. That is, at the model training stage, speech of a speaker with the largest energy is selected as the target audio. While, at a model usage stage, the models can automatically select and track the speech of the speaker with the largest energy without being provided with any target clue. The training manners herein may be replaced with other solutions, typically, such as, a permutation invariant training (PIT) method. The PIT method determines correct output arrangement by calculating a lowest value of a target function in an arrangement $A_{\psi_t}: v \to P, v \times P \to c$ extracted from all possible abstract features corresponding to the speech of the target speaker and interference signals:

$$L_{\theta,\varphi}^{(MSE)} = \min_{c_t \in \{c_{t1}, c_{t2}\}} \sum_{t,f} \|x - xgSigmoid(c_t^T v_t, f)\|_2^2 + \quad (8)$$

$$\min_{c_t \in \{c_{t1}, c_{t2}\}} \sum_{t,f} \|e - xgSigmoid(c_t^T v_t, f)\|_2^2$$

The above model training method provides a model training manner that combines the unsupervised learning and the supervised learning in an alternating manner; based on the pre-trained encoding model and extraction model, performs the unsupervised training on the encoding model, the extraction model, and the estimation model by using the unlabeled training samples combined with the estimation model, and optimizes the model parameters of the extraction model and the estimation model; and performs the supervised training on the encoding model and the extraction model by using the labeled training samples, and optimizes the model parameter of the encoding model. The unsupervised training and the supervised training are performed in the alternating manner until the training is finished. In this way, the robust and generalizable representation capability learned by unsupervised learning and the discrimination capability learned by supervised learning are mutually optimized in iterations, so that the trained encoding model and extraction model have better effects in speech separation, and only a small quantity of labeled samples are required in a model training process, thereby greatly reducing costs.

In an embodiment, the speech separation model training method further includes: steps of pre-training the encoding model and the extraction model. The steps specifically include: performing FT on the first audio, to obtain an audio feature of the first audio; encoding the audio feature through the encoding model, to obtain an embedding feature of the first audio; extracting the embedding feature through the extraction model, to obtain an abstract feature of the target audio included in the first audio; and constructing a supervised training loss function to pre-train the encoding model and the extraction model according to the labeled audio of the first audio, the embedding feature of the first audio, and the abstract feature of the target audio included in the first audio.

In this embodiment of this application, a manner of pre-training the encoding model and the extraction model is supervised training. A supervised training process is similar to the process of S108, but the model parameters of the encoding model and the extraction model may be updated in the pre-training stage.

In an embodiment, the performing FT on the first audio, to obtain an audio feature of the first audio includes: performing STFT on the first audio, to obtain time-frequency points of the first audio; and obtaining a time-frequency feature formed by the time-frequency points as the audio feature of the first audio.

Specifically, the computer device may perform the STFT on the first audio, to obtain a short-time Fourier spectrum $\chi \subseteq R^{TF}$ of the first audio, where T represents a quantity of frames of a time dimension, F represents a quantity of frequency bands of a frequency dimension, and R represents a real number.

In this embodiment of this application, the short-time Fourier spectrum of the first audio is used as input data (training samples) of the encoding model. In this way, a group of labeled training samples obtained from a group of labeled first audio may be represented to: $\{X^{(L+U+1)}, X^{(L+U+2)}, \ldots, X^{(L+U+N)} \in \chi\}$. Then, each training sample may be a group of time-frequency points $\{x=X_{t,f}\}_{t=1,\ldots,T; f=1,\ldots,F}$ of an input space. $X_{t,f}$ may represent time-frequency points of a $f^{th}$ frequency band in a $t^{th}$ frame. A time-frequency feature formed by these time-frequency points may be specifically a real number matrix with a dimension of T×F.

In an embodiment, the computer device may map a low-dimensional audio feature to a high-dimensional embedding space through the encoding model, to obtain an embedding feature.

Specifically, the computer device may input a time-frequency point matrix (the time-frequency feature) of the first audio obtained by performing the STFT on the first audio into the encoding model. The encoding model performs non-linear operation on the input, and embeds the inputs into a D-dimensional embedding space, to obtain the embedding feature of the first audio in the embedding space.

For example, the encoding model is: $E_\theta: \chi \to v \subseteq R^{TF \times D}$, where $\theta$ is the model parameter of the encoding model, D is a dimension of the embedding space, $E_\theta$ represents an operation process of mapping an input domain $\chi$ to a high-dimensional embedding space v. An embedding feature obtained by mapping a time-frequency feature formed by a group of time-frequency points in the input space is a real number matrix with a dimension of T×F×D. An input domain $\chi \subseteq R^{TF}$ represents a short-time Fourier spectrum of the audio, T represents a quantity of frames of a time dimension, and F represents a quantity of frequency bands of a frequency dimension. The input of the encoding model is a group of time-frequency points (T×F) belonging to the input domain, this group of time-frequency points may be divided into T groups according to frames, with time-frequency points (1×F) per group, namely, time-frequency points of each frame of the audio. Then, an embedding feature v of an output domain may alternatively be an embedding feature $v_t$ corresponding to each frame of the audio, namely, each frame of the second audio respectively corresponds to an embedding feature, and may alternatively be referred to as a time-varying embedding feature.

In an embodiment, the extracting the embedding feature through the extraction model, to obtain an abstract feature of the target audio included in the first audio includes: processing the embedding feature through a first hidden layer of the extraction model, to obtain a prediction probability that the time-frequency points of the first audio are time-frequency points of the target audio; and operating embedding features of the time-frequency points and prediction probabilities of the time-frequency points through the second hidden layer of the extraction model, to construct a time-varying abstract feature of the target audio included in the first audio.

Specifically, the processing on the embedding feature of the first audio is performed through the first hidden layer of the extraction model, so that the prediction probability that the time-frequency points of the first audio are predicted to belong to the time-frequency points of the target audio may be obtained. The embedding features of the time-frequency points and the prediction probabilities of the time-frequency points are operated through the second hidden layer of the extraction model, so that the time-varying abstract feature of the target audio included in the first audio may be obtained.

For example, the extraction model is $A_\varphi: v \to P \subseteq R^{TF}$, $v \times P \to C \subseteq R^D$, where $\varphi$ is the model parameter of the extraction model. $A_\varphi$ represents that the embedding feature v is converted into a probability matrix p, and an operation process of an abstract feature c is obtained according to operation on the embedding feature v and the probability matrix p. p is a real number matrix with a dimension of T×F. c is a real number vector with a dimension of D×1 or 1×D. The input of the encoding model is the group of time-frequency points (T×F) belonging to the input domain, and p is a real number matrix with a dimension of T×F. In this way, p may be a probability matrix formed by prediction probabilities respectively corresponding to T×F time-frequency points. The prediction probabilities represent probabilities that the time-frequency points are predicted to belong to the time-frequency points of the target audio.

In a specific embodiment, the extraction model may calculate the time-varying abstract feature by using the formula (5) or the formula (6).

In a specific embodiment, the extraction model may specifically use an autoregression model, and construct the time-varying abstract feature based on a local embedding feature (an embedding feature of a current frame of the second audio). Alternatively, the extraction model may alternatively use a recurrent model or an abstract function, and construct the time-varying abstract feature based on the local embedding feature.

In this embodiment, the extraction model extracts, through supervised learning, a time-domain and high-time-domain-resolution abstract feature from the embedding features, which can more accurately reconstruct a spectrum of the target audio in the mixed audio, thereby performing supervised learning.

In an embodiment, the constructing a supervised training loss function to pre-train the encoding model and the extraction model according to the labeled audio of the first audio, the embedding feature of the first audio, and the abstract feature of the target audio included in the first audio includes: determining a spectrum mask of the target audio included in the first audio according to the embedding feature of the first audio and the abstract feature of the target audio included in the first audio; reconstruct the target audio based on the spectrum mask; and construct the supervised training loss function to pre-train the encoding model and the extraction model according to a difference between the reconstructed target audio and the labeled audio of the first audio.

The spectrum of the target audio is reconstructed. Specifically, in the supervised training, the computer device may reconstruct a type of target function as the supervised training loss function. Through this type of target function, the supervised training model may ensure to some extent that features learned from the intermediate layer are encoding for the target audio. This also shows a reason for effectively estimating the reliable combined probability distribution used for unsupervised training by combining the discriminative learning capability of supervised training.

In a specific embodiment, the supervised training loss function may specifically estimate a mean square error (MSE) between the spectrum of the target audio and the spectrum of the labeled audio, as shown in the formula (7).

In other embodiments, the supervised training function may alternatively use another reconstruction type of target function, for example, a scale-invariant signal-to-noise ratio (SI-SNR) target function, or the like.

Further, the computer device may adjust the model parameters of the encoding model and the extraction model according to the direction of minimizing the supervised training loss function.

In the above embodiments, the labeled first audio is used for supervised training, the encoding model and the extraction model are pre-trained, and a relatively stable discriminative embedding feature space is constructed through the encoding model, and the reliable combined probability distribution for subsequent unsupervised learning is effectively estimated based on the stable discriminative embedding feature space.

In a specific embodiment, the labeled first audio is labeled mixed signals, and the unlabeled second audio includes unlabeled mixed signals and pure noise signals.

When the computer device jointly trains the encoding model, the extraction model, and the estimation model, a spectrum $\{X^{(L+U+1)}, X^{(L+U+2)}, \ldots, X^{(L+U+N)} \in \chi\}$ of the labeled mixed signals, a spectrum $\{X^{(1)}, X^{(2)}, \ldots, X^{(L)} \in \chi\}$ of the unlabeled mixed signals, and a spectrum $\{X^{(L+1)}, X^{(L+2)}, \ldots, X^{(L+U)} \in \chi\}$ of the pure noise signals may be obtained. Time-frequency points $\{x = X_{t,f}\}_{t=1,\ldots,T; f=1,\ldots,F}$ of these spectra are used as input data. T represents a quantity of frames of a time dimension, F represents a quantity of frequency bands of a frequency dimension, and $X_{t,f}$ may represent time-frequency points of a $f^{th}$ frequency band in a $t^{th}$ frame. For example, the mixed signals may specifically use a sampling rate of 16 kHz, and the spectrum of the mixed signals may specifically use an STFT window length of 25 ms, window shift of 10 ms, and 257 STFT frequency bands.

The computer device may set a size of batch processing data, an initial learning rate $\alpha$ and $\beta$, and a weight reduction coefficient of the learning rate. For example, the computer device may specifically set the size of batch processing data to 32, the initial learning rate to 0.0001, and the weight reduction coefficient of the learning rate to 0.8.

At the pre-training stage, the computer device may divide the labeled mixed signals into more than one batch of mixed signals according to the size of the batch processing data. For time-frequency points of each batch of mixed signals, after the encoding model and the extraction model are inputted, $\arg\min_{\theta,\psi} L_{\theta,\psi}^{(MSE)}$ is calculated based on the formula (7), and the model parameters $(\theta,\psi)$ of the encoding model and the extraction model are updated until the models converge.

The computer device calculates a prediction probability p through the pre-trained extraction model, and divide the time-frequency points of the labeled mixed signals and the labeled mixed signals into time-frequency-point positive samples and time-frequency-point negative samples.

$$x = \begin{cases} \chi^+, & \text{if } p_{t,f} > \Gamma^+ \\ \chi^-, & \text{if } p_{t,f} < \Gamma^- \end{cases} \quad (9)$$

$\Gamma^+$ and $\Gamma^-$ are probability thresholds. For example, $\Gamma^+ = 0.5$.

At an overlapping training stage, the computer device may divide the mixed signals into more than one batch of mixed signals according to the size of the batch processing data. For each time-frequency-point positive sample $\chi_t^+$, K time-frequency-point negative samples are randomly selected from a noise interference combined set $\chi_t^+ \cup \{X^{(L+1)}, X^{(L+2)}, \ldots, X^{(L+U)}\}$. In this way, based on the formula (4), the model parameters $(\psi, \omega)$ of the extraction model and the MI estimation model are updated according to $(\psi, \omega) - \alpha \times \partial L_\Theta^{(ImNICE)}/\partial(\psi, \omega)$; and based on the formula (7), the model parameter $\theta$ of the encoding model is updated according to $\theta - \beta \times \partial L_\Theta^{(MSE)}/\partial \theta$, until the models converge.

A quantity of output layer nodes of the encoding model is set to 40, a quantity of random down-sampling frames for each segment of mixed audio is set to 32, and a quantity of negative samples corresponding to each positive sample in the formula (4) is set to 63. The operation of dividing into time-frequency-point positive samples and time-frequency-point negative samples may be performed outside iterations of the overlapping training stage or inside iterations of the overlapping training stage. The difference between the two is that the former has a smaller calculation amount in each iteration, but convergence may be slower; and the latter has a greater calculation amount in each iteration, but convergence may be quicker. When MSE loss of the models is not improved for three consecutive training iterations, it may be considered that the training has reached convergence and the training is finished.

In an embodiment, the speech separation model training method further includes model use steps, and the model use steps specifically include: obtaining mixed audio on which speech separation is to be performed; processing an audio feature of the mixed audio through the encoding model obtained after finishing the unsupervised training and the supervised training, to obtain an embedding feature of the mixed audio; processing the embedding feature of the mixed audio through the extraction model obtained after finishing the unsupervised training and the supervised training, to obtain an abstract feature of the target audio included in the mixed audio; and reconstructing the target audio in the mixed audio according to the embedding feature of the mixed audio and the abstract feature of the target audio included in the mixed audio.

The mixed audio on which speech separation is to be performed is audio mixed with the target audio. The target audio may be specifically speech of a target speaker. The mixed audio may be specifically audio recorded in a session scenario with more than one speaker, speech of a speaker recorded in a noisy environment, or the like.

Figure 5:
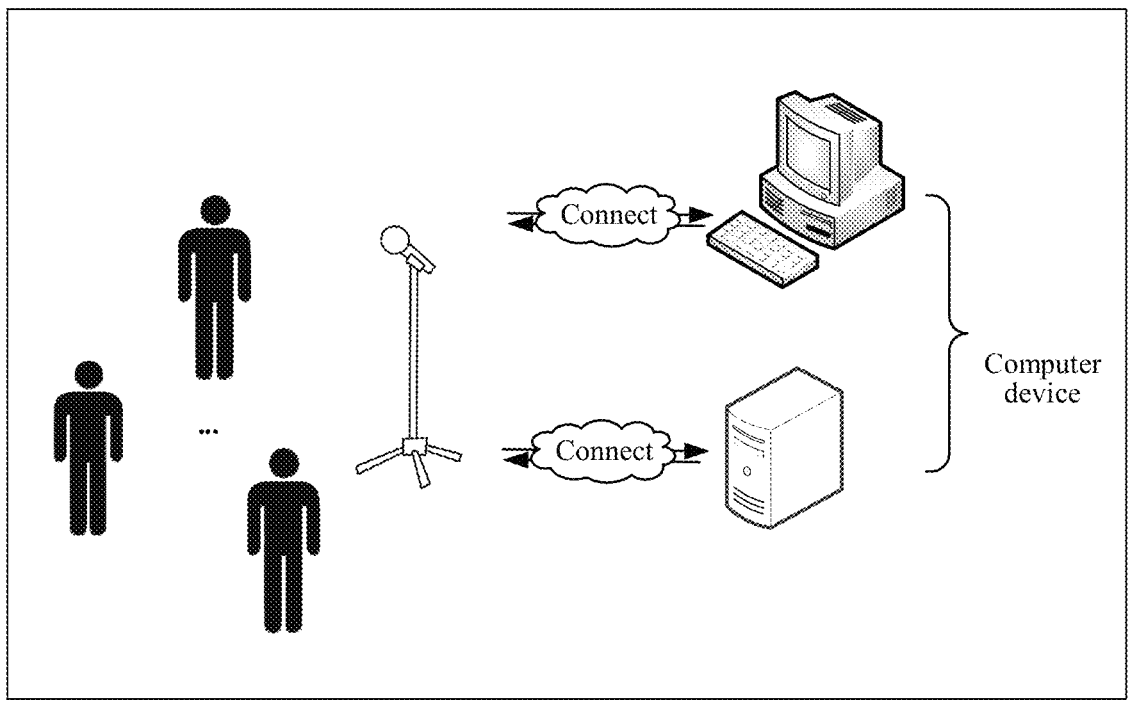
FIG. 5 is a diagram of an application environment of a speech separation scenario according to an embodiment.

For example, FIG. 5 is a schematic diagram of a speech separation scenario according to an embodiment. FIG. 5 includes more than one speaker. When these speakers have a session, audio is collected through a far field microphone, to obtain mixed audio. The far field microphone conveys the collected data to a computer device, and the computer device obtains mixed audio on which speech separation is to be performed.

Figure 6:
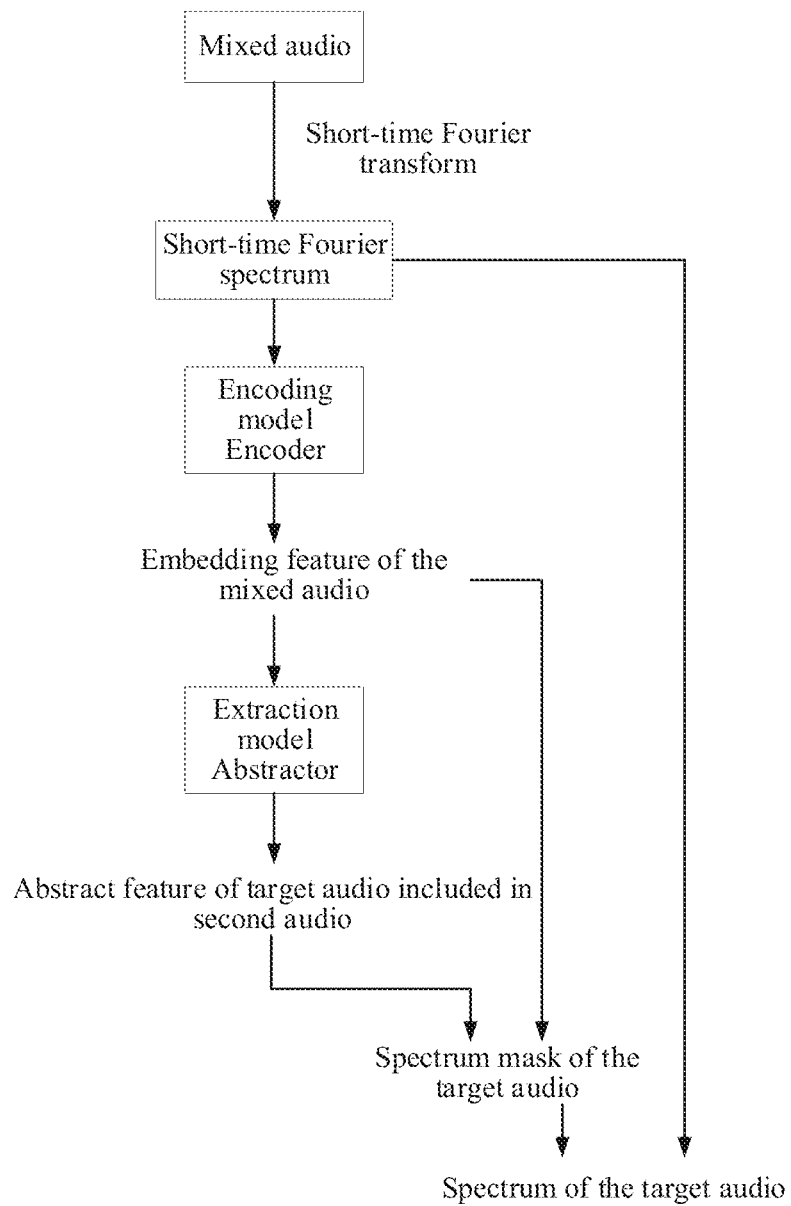
FIG. 6 is a schematic flowchart of speech separation according to an embodiment.

Referring to FIG. 6, specifically, after the mixed audio on which speech separation is to be performed is obtained, the computer device may perform STFT on the mixed audio, to obtain a short-time Fourier spectrum of the mixed audio; input time-frequency points of the short-time Fourier spectrum into the encoding model obtained after finishing the unsupervised training and the supervised training, where the encoding model outputs the embedding feature of the mixed audio; and inputs the embedding feature of the mixed audio into the extraction model obtained after finishing the unsupervised training and the supervised training, where the extraction model outputs the abstract feature of the target audio included in the mixed audio. The computer device generates a spectrum mask of the target audio in the mixed audio according to the embedding feature of the mixed audio and the abstract feature of the target audio included in the mixed audio; and obtains a spectrum of the target audio according to the short-time Fourier spectrum of the mixed audio, to separate the target audio.

In this embodiment, through the encoding model and the extraction model obtained after finishing the unsupervised training and the supervised training, a robust and generalizable feature of hidden signals can be effectively extracted from the mixed signal, which is more conducive to separating the hidden signals from the mixed signals.

In addition, under conditions of a variety of interference environments and a plurality of signal-to-noise ratio, 0 dB-20 dB music background noise interference, interference from other speakers, and background noise interference are included. The test in this application compares other existing methods that use unsupervised learning. A test result shows that, the model training manner provided in this application is better than these existing methods on speech separation performance including indicators, for example, perceptual evaluation of speech quality (PESQ), short-term objective intelligibility (STOI), and signal-to-distortion ratio (SDR), and stability. Moreover, the model training manner provided in this application can automatically learn the feature of the target audio included in the mixed audio (such as a feature of speech of the target speaker hidden in the mixed signals), and does not require additional permutation invariant training (PIT) method processing, a speaker tracking mechanism or processing and adjustment defined by an expert.

In this embodiment of this application, based on the provided model training method, the trained encoding model and extraction model can effectively learn the robust and generalizable feature of the hidden signals from disturbed mixed signals. In addition, in the embodiments of this application, a large amount of unlabeled data in real industrial application scenarios may be mined and used, and when a data scenario of model training and a data scenario actually used by the models are more mismatched, advantages of training manners of the overlapped supervised learning and unsupervised learning provided in the embodiments of this application are more obvious.

The encoding model and extraction model obtained through training in the embodiments of this application can be better applied to the separation of single-channel speech, and a typical cocktail problem can also be well solved.

Although the steps in the flowcharts of the embodiments are displayed sequentially according to instructions of arrows, these steps are not necessarily performed sequentially according to a sequence instructed by the arrows. Unless otherwise explicitly specified in this specification, execution of the steps is not strictly limited, and the steps may be performed in other orders. Moreover, at least a part of the steps in the foregoing embodiments may include a plurality of sub-steps or a plurality of stages. The sub-steps or stages are not necessarily performed at the same moment, but may be performed at different moments. The sub-steps or stages are not necessarily performed successively in order, but may be performed in turn or alternately with at least a part of other steps or sub-steps or stages of other steps.

Figure 7:
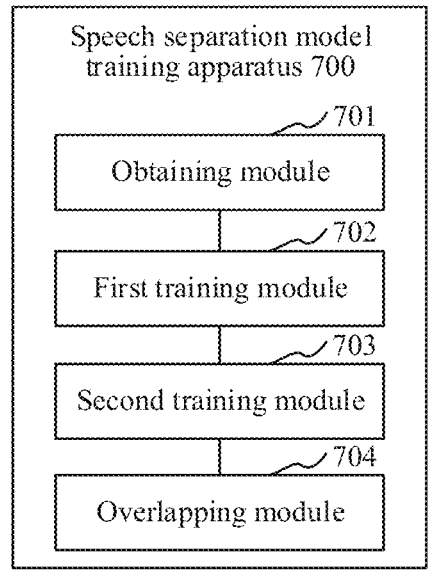
FIG. 7 is a structural block diagram of a speech separation model training apparatus according to an embodiment.

As shown in FIG. 7, in an embodiment, a speech separation model training apparatus 700 is provided. Referring to FIG. 7, the speech separation model training apparatus 700 includes: an obtaining module 701, a first training module 702, a second training module 703, and an overlapping module 704. The modules included in the speech separation model training apparatus may be implemented entirely or partially by software, hardware, or a combination thereof.

The obtaining module 701 is configured to obtain first audio and second audio, the first audio includes target audio and having corresponding labeled audio, and the second audio includes noise audio. obtain an encoding model, an extraction model, and an initial estimation model, where an output of the encoding model is an input of the extraction model, the output of the encoding model and an output of the extraction model is jointly inputs of the estimation model, and the encoding model and the extraction model being is jointly used for speech separation.

The first training module 702 is configured to perform unsupervised training on the encoding model, the extraction model, and the estimation model according to the second audio, and adjust model parameters of the extraction model and the estimation model.

The second training module 703 is configured to perform supervised training on the encoding model and the extraction model according to the first audio and the labeled audio corresponding to the first audio, and adjust the model parameter of the encoding model.

The overlapping module 704 is configured to continuously perform the unsupervised training and the supervised training, so that the unsupervised training and the supervised training are performed in an alternating manner, and the training is not finished until a training stop condition is met.

Figure 8:
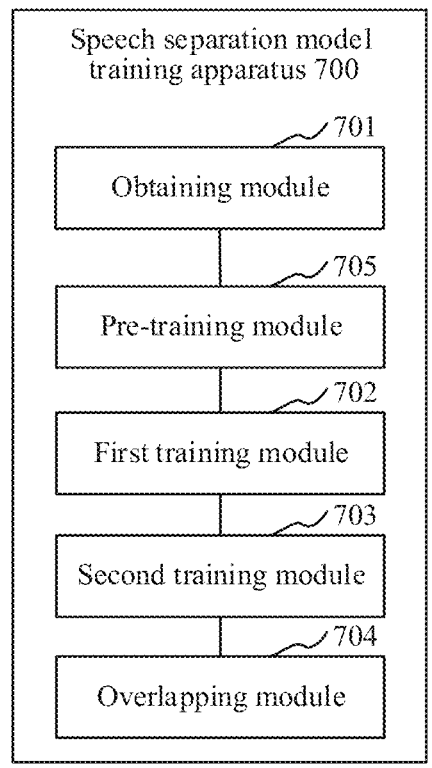
FIG. 8 is a structural block diagram of a speech separation model training apparatus according to another embodiment.

Referring to FIG. 8, in an embodiment, the speech separation model training apparatus 700 further includes: a pre-training module 705, configured to perform FT on the first audio, to obtain an audio feature of the first audio; encode the audio feature through the encoding model, to obtain an embedding feature of the first audio; extract the embedding feature through the extraction model, to obtain an abstract feature of the target audio included in the first audio; and construct a supervised training loss function to pre-train the encoding model and the extraction model according to the labeled audio of the first audio, the embedding feature of the first audio, and the abstract feature of the target audio included in the first audio.

In an embodiment, the pre-training module 705 is further configured to perform STFT on the first audio, to obtain time-frequency points of the first audio; and obtain a time-frequency feature formed by the time-frequency points as the audio feature of the first audio.

In an embodiment, the pre-training module 705 is further configured to perform a processing on the embedding feature through a first hidden layer of the extraction model, to obtain a prediction probability that the time-frequency points of the first audio are time-frequency points of the target audio; and operate embedding features of the time-frequency points and prediction probabilities of the time-frequency points through a second hidden layer of the extraction model, to construct a time-varying abstract feature of the target audio included in the first audio.

In an embodiment, the pre-training module 705 is further configured to determine a spectrum mask of the target audio included in the first audio according to the embedding feature of the first audio and the abstract feature of the target audio included in the first audio; reconstruct the target audio based on the spectrum mask; and construct the supervised training loss function to pre-train the encoding model and the extraction model according to a difference between the reconstructed target audio and the labeled audio of the first audio.

In an embodiment, the first training module 702 is further configured to encode an audio feature of the second audio through the encoding model, to obtain an embedding feature of the second audio; extract the embedding feature of the second audio through the extraction model, to obtain an abstract feature of the target audio included in the second audio; perform a processing on the embedding feature of the second audio and the abstract feature of the target audio included in the second audio through the estimation model, to obtain an MI estimation feature between the second audio and the abstract feature of the target audio included in the second audio; construct an unsupervised training loss function according to the MI estimation feature; and fix the model parameter of the encoding model, and adjust the model parameters of the extraction model and the estimation model according to a direction of minimizing the unsupervised training loss function.

In an embodiment, the first training module 702 is further configured to perform a processing on the embedding feature of the second audio through the first hidden layer of the extraction model, to obtain a prediction probability that time-frequency points of the second audio are the time-frequency points of the target audio; and chronologically operate embedding features of the time-frequency points and prediction probabilities of the time-frequency points through the second hidden layer of the extraction model, to construct a global abstract feature of the target audio included in the second audio.

In an embodiment, the first training module 702 is further configured to divide first time-frequency points predicted to be positive samples according to the prediction probabilities of the time-frequency points; obtain second time-frequency points used as negative samples, the second time-frequency points being taken from a noise proposal distribution obeyed by time-frequency points of the pure noise audio; and construct the unsupervised training loss function according to an MI estimation feature corresponding to the first time-frequency points and an MI estimation feature corresponding to the second time-frequency points.

In an embodiment, the second training module 703 is further configured to encode the audio feature of the first audio through the encoding model, to obtain the embedding feature of the first audio; extract the embedding feature of the first audio through the extraction model, to obtain an abstract feature of the target audio included in the first audio; construct a supervised training loss function according to the labeled audio of the first audio, the embedding feature of the first audio, and the abstract feature of the target audio included in the first audio; and fix the model parameter of the extraction model, and adjusting the model parameter of the encoding model and the estimation model according to a direction of minimizing the supervised training loss function.

Figure 9:
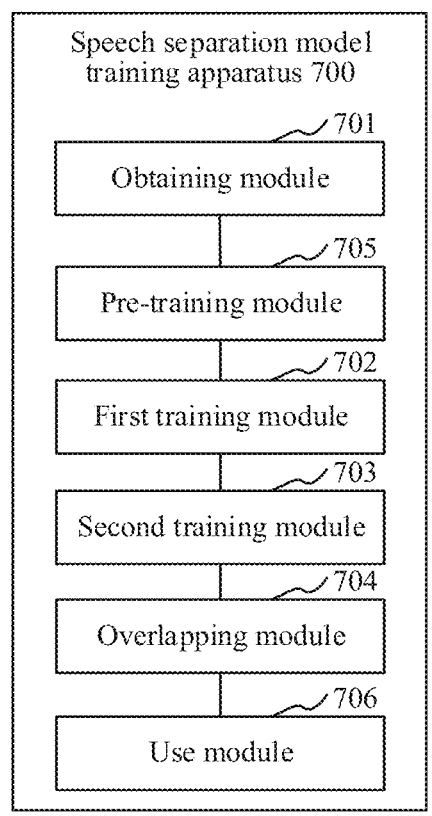
FIG. 9 is a structural block diagram of a speech separation model training apparatus according to another embodiment.

Referring to FIG. 9, in an embodiment, the speech separation model training apparatus 700 further includes a use module 706, configured to obtain mixed audio on which speech separation is to be performed; perform a processing on an audio feature of the mixed audio through the encoding model obtained after finishing the unsupervised training and the supervised training, to obtain an embedding feature of the mixed audio; perform a processing on the embedding feature of the mixed audio through the extraction model obtained after finishing the unsupervised training and the supervised training, to obtain an abstract feature of the target audio included in the mixed audio; and reconstruct the target audio in the mixed audio according to the embedding feature of the mixed audio and the abstract feature of the target audio included in the mixed audio.

In an embodiment, the first audio and the second audio are single-channel audio; the first audio is the mixed audio including the target audio; the labeled audio of the first audio is the pure target audio; and the second audio includes the pure noise audio and the mixed audio including the noise audio.

Figure 10:
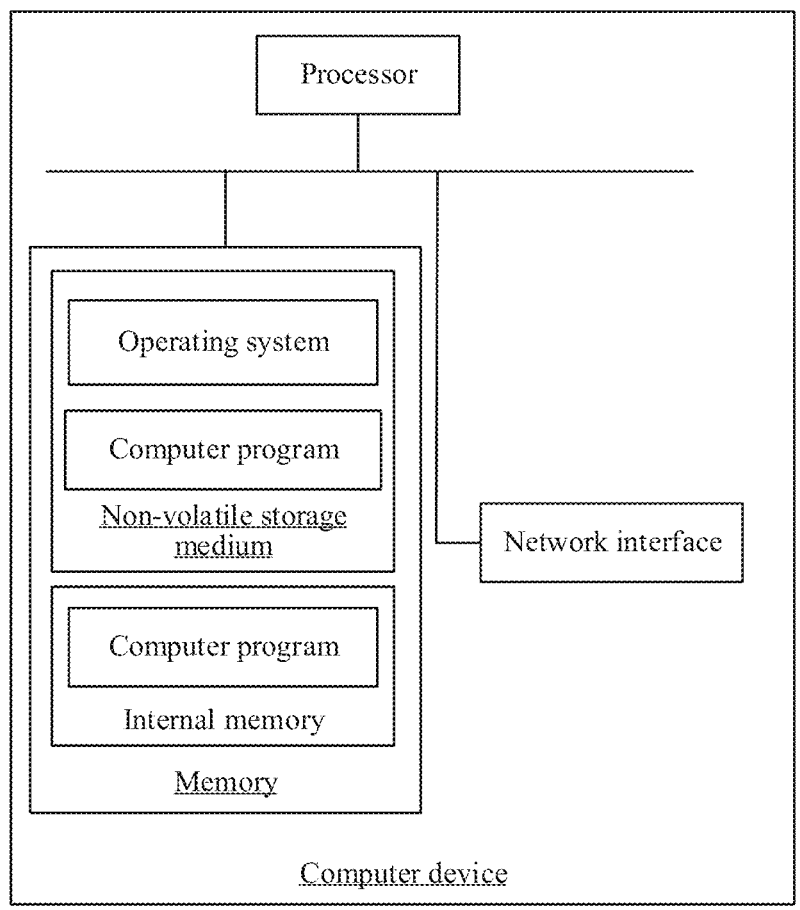
FIG. 10 is a structural block diagram of a computer device according to an embodiment.

FIG. 10 is a diagram of an internal structure of a computer device according to an embodiment. The computer device may be specifically the terminal 110 or the server 120 in FIG. 3. As shown in FIG. 10, the computer device includes a processor, a memory, and a network interface connected by a system bus. The memory includes a non-transitory computer-readable storage medium and an internal memory. The non-transitory computer-readable storage medium of the computer device stores an operating system and may further store a computer program, the computer program, when executed by the processor, causing the processor to implement a speech separation model training method. The internal memory may also store a computer program, the computer program, when executed by the processor, causing the processor to perform the speech separation model training method. A person skilled in the art may understand that, the structure shown in FIG. 10 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, the speech separation model training apparatus provided in this application may be implemented in a form of a computer program, and the computer program may be run on the computer device shown in FIG. 10. A memory of the computer device may store program modules forming the speech separation model training apparatus, for example, the obtaining module 701, the first training module 702, the second training module 703, and the overlapping module 704 shown in FIG. 7. The computer program formed by the program modules causes the processor to perform steps in the speech separation model training method in embodiments of this application described in this specification.

For example, the computer device shown in FIG. 10 may obtain first audio and second audio by using the obtaining module 701 in the speech separation model training apparatus shown in FIG. 7, where the first audio includes target audio and having corresponding labeled audio, and the second audio includes noise audio; obtain an encoding model, an extraction model, and an initial estimation model, where an output of the encoding model is an input of the extraction model, the output of the encoding model and an output of the extraction model are jointly inputs of the estimation model, and the encoding model and the extraction model are jointly used for speech separation. The step of performing unsupervised training on the encoding model, the extraction model, and the estimation model according to the second audio, and adjusting model parameters of the extraction model and the estimation model is performed through the first training module 702. The step of performing supervised training on the encoding model and the extraction model according to the first audio and the labeled audio corresponding to the first audio, and adjusting a model parameter of the encoding model is performed through the second training module 703. The step of continuously performing the unsupervised training and the supervised training, so that the unsupervised training and the supervised training are performed in an alternating manner, and the training is not finished until a training stop condition is met is performed through the overlapping module 704. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an embodiment, a computer device is provided, including a memory and a processor, the memory storing a computer program, the computer program, when executed by the processor, causing the processor to perform the steps of the foregoing speech separation model training method. Herein, the steps of the speech separation model training method may be the steps of the speech separation model training method in the foregoing embodiments.

In an embodiment, a computer-readable storage medium is provided, storing a computer program, the computer program, when being executed by a processor, causing the processor to perform the steps of the foregoing speech separation model training method. Herein, the steps of the speech separation model training method may be the steps of the speech separation model training method in the foregoing embodiments.

In an embodiment, a computer program product or a computer program is provided. The computer program product or the computer program includes computer instructions, the computer instructions being stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of the procedures of the methods in the foregoing embodiments may be implemented by a computer program instructing related hardware. The program may be stored in a non-transitory computer-readable storage medium. When the program runs, the procedures of the foregoing method embodiments may be performed. Any reference to a memory, a storage, a database, or another medium used in the embodiments provided in this application may include a non-transitory and/or transitory memory. The non-transitory memory may include a read-only memory (ROM), a programmable ROM (PROM), an electrically programmable ROM (EPROM), an electrically erasable programmable ROM (EEPROM), a flash memory, or the like. The transitory memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRS-DRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only show several implementations of this application, and descriptions thereof are in detail, but are not to be understood as a limitation to the patent scope of this application. A person of ordinary skill in the art may further make several variations and improvements without departing from the ideas of this application, and such variations and improvements all fall within the protection scope of this application. Therefore, the protection scope of this application is subject to the protection scope of the appended claims.

What is claimed is:

1. A speech separation model training method performed by a computer device, the method comprising:
   obtaining first audio and second audio, the first audio comprising target audio and having corresponding labeled audio, and the second audio comprising noise audio;
   obtaining an encoding model, an extraction model, and an initial estimation model, an output of the encoding model being an input of the extraction model, the output of the encoding model and an output of the extraction model being jointly inputs of the estimation model;
   performing unsupervised training on the encoding model, the extraction model, and the estimation model according to the second audio, and adjusting model parameters of the extraction model and the estimation model;
   performing supervised training on the encoding model and the extraction model according to the first audio and the labeled audio corresponding to the first audio, and adjusting a model parameter of the encoding model; and
   continuously performing the unsupervised training and the supervised training in an alternating manner until a training stop condition is met.

2. The method according to claim 1, further comprising:
   performing Fourier Transform (FT) on the first audio, to obtain an audio feature of the first audio;
   encoding the audio feature through the encoding model, to obtain an embedding feature of the first audio;
   extracting the embedding feature through the extraction model, to obtain an abstract feature of the target audio comprised in the first audio; and
   constructing a supervised training loss function to pre-train the encoding model and the extraction model according to the labeled audio corresponding to the first audio, the embedding feature of the first audio, and the abstract feature of the target audio comprised in the first audio.

3. The method according to claim 2, wherein the performing FT on the first audio, to obtain an audio feature of the first audio comprises:
   performing short-time Fourier transform (STFT) on the first audio, to obtain time-frequency points of the first audio; and
   obtaining a time-frequency feature formed by the time-frequency points as the audio feature of the first audio.

4. The method according to claim 3, wherein the extracting the embedding feature through the extraction model, to obtain an abstract feature of the target audio comprised in the first audio comprises:
   processing the embedding feature through a first hidden layer of the extraction model, to obtain a prediction probability that the time-frequency points of the first audio are time-frequency points of the target audio; and
   operating embedding features of the time-frequency points and prediction probabilities of the time-frequency points through a second hidden layer of the extraction model, to construct a time-varying abstract feature of the target audio comprised in the first audio.

5. The method according to claim 2, wherein the constructing a supervised training loss function to pre-train the encoding model and the extraction model according to the labeled audio of the first audio, the embedding feature of the first audio, and the abstract feature of the target audio comprised in the first audio comprises:
- determining a spectrum mask of the target audio comprised in the first audio according to the embedding feature of the first audio and the abstract feature of the target audio comprised in the first audio;
- reconstructing the target audio based on the spectrum mask; and
- constructing the supervised training loss function to pre-train the encoding model and the extraction model according to a difference between the reconstructed target audio and the labeled audio of the first audio.

6. The method according to claim 1, wherein the performing unsupervised training on the encoding model, the extraction model, and the estimation model according to the second audio, and adjusting model parameters of the extraction model and the estimation model comprises:
- encoding an audio feature of the second audio through the encoding model, to obtain an embedding feature of the second audio;
- extracting the embedding feature of the second audio through the extraction model, to obtain an abstract feature of the target audio comprised in the second audio;
- processing the embedding feature of the second audio and the abstract feature of the target audio comprised in the second audio through the estimation model, to obtain a mutual information (MI) estimation feature between the second audio and the abstract feature of the target audio comprised in the second audio;
- constructing an unsupervised training loss function according to the MI estimation feature; and
- fixing the model parameter of the encoding model, and adjusting the model parameters of the extraction model and the estimation model according to a direction of minimizing the unsupervised training loss function.

7. The method according to claim 6, wherein the extracting the embedding feature of the second audio through the extraction model, to obtain an abstract feature of the target audio comprised in the second audio comprises:
- processing the embedding feature of the second audio through the first hidden layer of the extraction model, to obtain a prediction probability that time-frequency points of the second audio are the time-frequency points of the target audio; and
- chronologically operating embedding features of the time-frequency points and prediction probabilities of the time-frequency points through the second hidden layer of the extraction model, to construct a global abstract feature of the target audio comprised in the second audio.

8. The method according to claim 7, wherein the constructing an unsupervised training loss function according to the MI estimation feature comprises:
- dividing first time-frequency points predicted to be positive samples according to the prediction probabilities of the time-frequency points;
- obtaining second time-frequency points used as negative samples, the second time-frequency points being taken from a noise proposal distribution obeyed by time-frequency points of pure noise audio; and
- constructing the unsupervised training loss function according to an MI estimation feature corresponding to the first time-frequency points and an MI estimation feature corresponding to the second time-frequency points.

9. The method according to claim 1, wherein the performing supervised training on the encoding model and the extraction model according to the first audio and the labeled audio corresponding to the first audio, and adjusting a model parameter of the encoding model comprises:
- encoding an audio feature of the first audio through the encoding model, to obtain an embedding feature of the first audio;
- extracting the embedding feature of the first audio through the extraction model, to obtain an abstract feature of the target audio comprised in the first audio;
- constructing a supervised training loss function according to the labeled audio of the first audio, the embedding feature of the first audio, and the abstract feature of the target audio comprised in the first audio; and
- fixing the model parameter of the extraction model, and adjusting the model parameter of the encoding model and the estimation model according to a direction of minimizing the supervised training loss function.

10. The method according to claim 1, further comprising:
- obtaining mixed audio on which speech separation is to be performed;
- processing an audio feature of the mixed audio through the encoding model obtained after finishing the unsupervised training and the supervised training, to obtain an embedding feature of the mixed audio;
- processing the embedding feature of the mixed audio through the extraction model obtained after finishing the unsupervised training and the supervised training, to obtain an abstract feature of the target audio comprised in the mixed audio; and
- reconstructing the target audio in the mixed audio according to the embedding feature of the mixed audio and the abstract feature of the target audio comprised in the mixed audio.

11. The method according to claim 10, wherein the first audio and the second audio are single-channel audio; the first audio is the mixed audio comprising the target audio; the labeled audio of the first audio is pure target audio; and the second audio comprises the pure noise audio and the mixed audio comprising the noise audio.

12. A computer device, comprising a memory and a processor, the memory storing computer-readable instructions, the computer-readable instructions, when executed by the processor, causing the computer device to perform a speech separation model training method including:
- obtaining first audio and second audio, the first audio comprising target audio and having corresponding labeled audio, and the second audio comprising noise audio;
- obtaining an encoding model, an extraction model, and an initial estimation model, an output of the encoding model being an input of the extraction model, the output of the encoding model and an output of the extraction model being jointly inputs of the estimation model;
- performing unsupervised training on the encoding model, the extraction model, and the estimation model according to the second audio, and adjusting model parameters of the extraction model and the estimation model;
- performing supervised training on the encoding model and the extraction model according to the first audio and the labeled audio corresponding to the first audio, and adjusting a model parameter of the encoding model; and continuously performing the unsupervised training and the supervised training in an alternating manner until a training stop condition is met.

13. The computer device according to claim 12, wherein the speech separation model training method further comprises:
performing Fourier Transform (FT) on the first audio, to obtain an audio feature of the first audio;
encoding the audio feature through the encoding model, to obtain an embedding feature of the first audio;
extracting the embedding feature through the extraction model, to obtain an abstract feature of the target audio comprised in the first audio; and
constructing a supervised training loss function to pre-train the encoding model and the extraction model according to the labeled audio corresponding to the first audio, the embedding feature of the first audio, and the abstract feature of the target audio comprised in the first audio.

14. The computer device according to claim 12, wherein the performing unsupervised training on the encoding model, the extraction model, and the estimation model according to the second audio, and adjusting model parameters of the extraction model and the estimation model comprises:
encoding an audio feature of the second audio through the encoding model, to obtain an embedding feature of the second audio;
extracting the embedding feature of the second audio through the extraction model, to obtain an abstract feature of the target audio comprised in the second audio;
processing the embedding feature of the second audio and the abstract feature of the target audio comprised in the second audio through the estimation model, to obtain a mutual information (MI) estimation feature between the second audio and the abstract feature of the target audio comprised in the second audio;
constructing an unsupervised training loss function according to the MI estimation feature; and
fixing the model parameter of the encoding model, and adjusting the model parameters of the extraction model and the estimation model according to a direction of minimizing the unsupervised training loss function.

15. The computer device according to claim 12, wherein the performing supervised training on the encoding model and the extraction model according to the first audio and the labeled audio corresponding to the first audio, and adjusting a model parameter of the encoding model comprises:
encoding an audio feature of the first audio through the encoding model, to obtain an embedding feature of the first audio;
extracting the embedding feature of the first audio through the extraction model, to obtain an abstract feature of the target audio comprised in the first audio;
constructing a supervised training loss function according to the labeled audio of the first audio, the embedding feature of the first audio, and the abstract feature of the target audio comprised in the first audio; and
fixing the model parameter of the extraction model, and adjusting the model parameter of the encoding model and the estimation model according to a direction of minimizing the supervised training loss function.

16. The computer device according to claim 12, wherein the speech separation model training method further comprises:
obtaining mixed audio on which speech separation is to be performed;
processing an audio feature of the mixed audio through the encoding model obtained after finishing the unsupervised training and the supervised training, to obtain an embedding feature of the mixed audio;
processing the embedding feature of the mixed audio through the extraction model obtained after finishing the unsupervised training and the supervised training, to obtain an abstract feature of the target audio comprised in the mixed audio; and
reconstructing the target audio in the mixed audio according to the embedding feature of the mixed audio and the abstract feature of the target audio comprised in the mixed audio.

17. The computer device according to claim 16, wherein the first audio and the second audio are single-channel audio; the first audio is the mixed audio comprising the target audio; the labeled audio of the first audio is pure target audio; and the second audio comprises the pure noise audio and the mixed audio comprising the noise audio.

18. A non-transitory computer-readable storage medium storing computer-readable instructions, the computer-readable instructions, when executed by one or more processors of a computer device, causing the computer device to perform a speech separation model training method including:
obtaining first audio and second audio, the first audio comprising target audio and having corresponding labeled audio, and the second audio comprising noise audio;
obtaining an encoding model, an extraction model, and an initial estimation model, an output of the encoding model being an input of the extraction model, the output of the encoding model and an output of the extraction model being jointly inputs of the estimation model;
performing unsupervised training on the encoding model, the extraction model, and the estimation model according to the second audio, and adjusting model parameters of the extraction model and the estimation model;
performing supervised training on the encoding model and the extraction model according to the first audio and the labeled audio corresponding to the first audio, and adjusting a model parameter of the encoding model; and
continuously performing the unsupervised training and the supervised training in an alternating manner until a training stop condition is met.

19. The non-transitory computer-readable storage medium according to claim 18, wherein the performing unsupervised training on the encoding model, the extraction model, and the estimation model according to the second audio, and adjusting model parameters of the extraction model and the estimation model comprises:
encoding an audio feature of the second audio through the encoding model, to obtain an embedding feature of the second audio;
extracting the embedding feature of the second audio through the extraction model, to obtain an abstract feature of the target audio comprised in the second audio;
processing the embedding feature of the second audio and the abstract feature of the target audio comprised in the second audio through the estimation model, to obtain a mutual information (MI) estimation feature between the second audio and the abstract feature of the target audio comprised in the second audio;

constructing an unsupervised training loss function according to the MI estimation feature; and fixing the model parameter of the encoding model, and adjusting the model parameters of the extraction model and the estimation model according to a direction of minimizing the unsupervised training loss function.

20. The non-transitory computer-readable storage medium according to claim 18, wherein the performing supervised training on the encoding model and the extraction model according to the first audio and the labeled audio corresponding to the first audio, and adjusting a model parameter of the encoding model comprises:

encoding an audio feature of the first audio through the encoding model, to obtain an embedding feature of the first audio;

extracting the embedding feature of the first audio through the extraction model, to obtain an abstract feature of the target audio comprised in the first audio;

constructing a supervised training loss function according to the labeled audio of the first audio, the embedding feature of the first audio, and the abstract feature of the target audio comprised in the first audio; and fixing the model parameter of the extraction model, and adjusting the model parameter of the encoding model and the estimation model according to a direction of minimizing the supervised training loss function.

\* \* \* \* \*